(12) United States Patent
Volta et al.

(10) Patent No.: US 10,025,966 B1
(45) Date of Patent: Jul. 17, 2018

(54) CODED IMAGE CAPTURE SYSTEM OF COMPONENTS

(71) Applicant: Datalogic IP Tech S.r.l., Bologna (IT)

(72) Inventors: Valentina Volta, Bologna (IT); Claudio Mazzone, Bologna (IT)

(73) Assignee: Datalogic IP Tech S.R.L., Bologne (IT)

( * ) Notice: Subject to any disclaimer, the term of this patent is extended or adjusted under 35 U.S.C. 154(b) by 0 days.

(21) Appl. No.: 15/481,621

(22) Filed: Apr. 7, 2017

(51) Int. Cl.
*G06K 7/10* (2006.01)
*H02J 7/02* (2016.01)

(52) U.S. Cl.
CPC ......... *G06K 7/109* (2013.01); *G06K 7/10297* (2013.01); *G06K 7/10722* (2013.01)

(58) Field of Classification Search
CPC .... G08B 13/14; G08B 13/24; G06K 7/10881; G06K 7/10; G06K 9/228
USPC .............. 235/462.01–462.49, 472.01–472.03
See application file for complete search history.

(56) References Cited

U.S. PATENT DOCUMENTS

| 5,070,293 | A | 12/1991 | Ishii et al. |
| 7,683,572 | B2 | 3/2010 | Toya |
| 9,087,251 | B2 | 7/2015 | Tamburrini et al. |
| 9,478,113 | B2 | 10/2016 | Xie et al. |
| 9,515,512 | B2 | 12/2016 | O'Donnell et al. |

| 2009/0224039 | A1* | 9/2009 | Hause | G06K 7/0004 235/385 |
| 2012/0319645 | A1* | 12/2012 | O'Donnell | H02J 7/025 320/108 |
| 2016/0350563 | A1 | 12/2016 | Ye et al. | |
| 2017/0179773 | A1* | 6/2017 | Kim | H02J 50/80 |

FOREIGN PATENT DOCUMENTS

CN 205581887 U 9/2016

OTHER PUBLICATIONS

Effect of Coupling Between Multiple Transmitters or Multiple Receivers on Wireless Power Transfer, Dukju Ahn and Songcheol Hong, IEEE Trans. on Industrial Electronics, vol. 60, No. 7, Jul. 2013, 12 pages

* cited by examiner

*Primary Examiner* — Daniel Hess
(74) *Attorney, Agent, or Firm* — The Juhasz Law Firm

(57) ABSTRACT

A reader includes a scanning head that includes an optical sensor to capture an indicia that encodes data and a processor to interpret the indicia to decode the data, and an elongate handle connected at a first end to the scanning head and graspable to orient the optical sensor toward the indicia. The elongate handle includes a first handle receiving coil disposed at a second end of the elongate handle opposite the first end, and oriented parallel to a first side of the elongate handle, a second handle receiving coil disposed at the second end, and oriented parallel to a second side of the elongate handle that is opposite the first side of the elongate handle, and a battery to provide electric power to the processor and the optical sensor, and configured to be recharged via the first and second handle receiving coils.

23 Claims, 22 Drawing Sheets

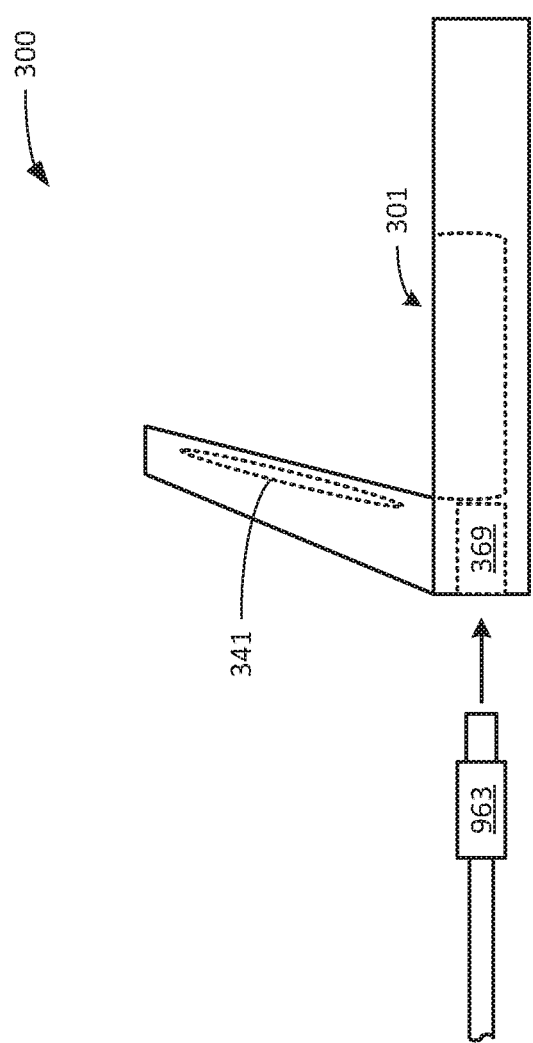

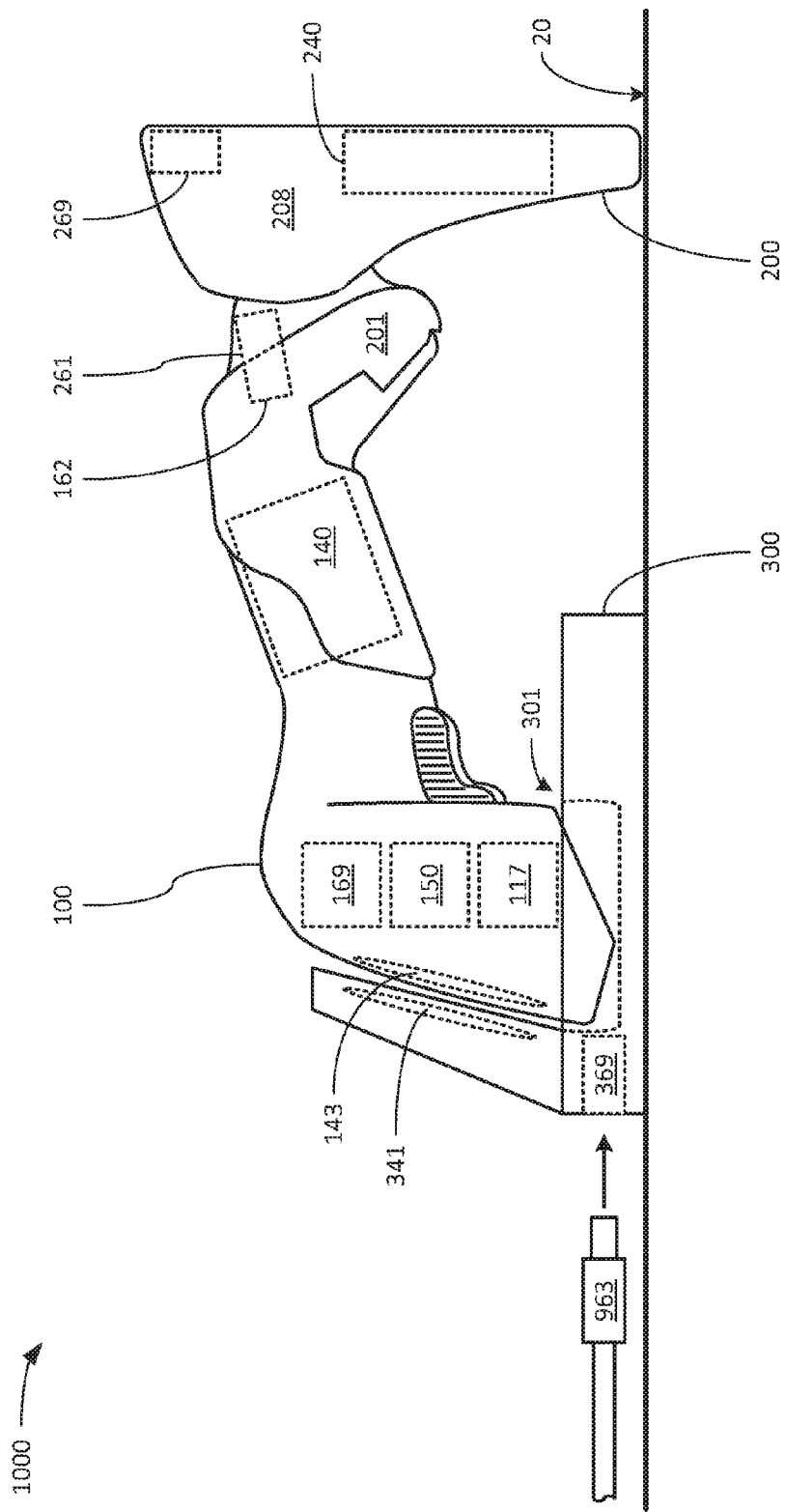

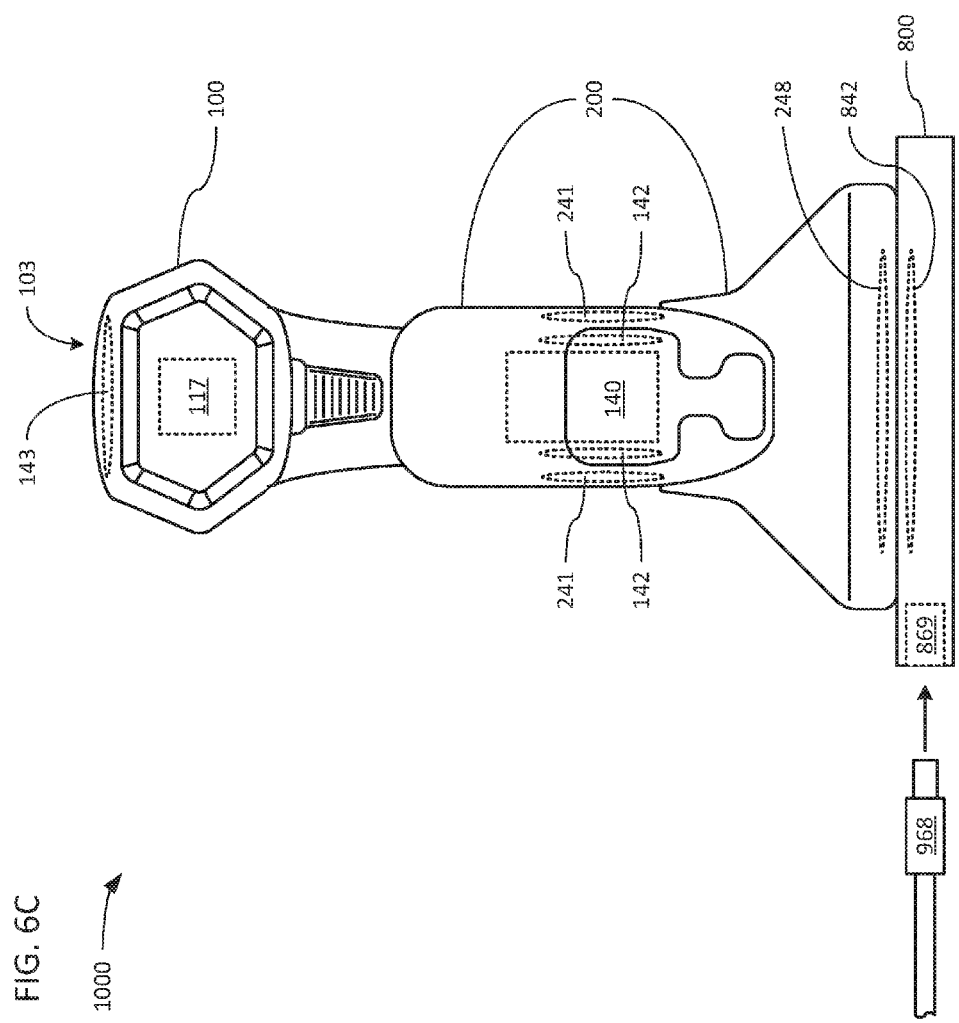

CODED IMAGE CAPTURE SYSTEM OF COMPONENTS

BACKGROUND OF THE INVENTION

1. Field of the Invention

The present invention relates to devices for wirelessly capturing encoded data.

2. Description of the Related Art

Handheld scanning devices are well known and used in a wide range of enterprise applications. Barcode scanners are regularly used in connection with checkout stations at supermarkets and other retail establishments for reading barcodes on consumer goods. They are also useful in inventory collection and control for warehousing, shipping and storage of products.

The conditions under which such handheld scanning devices are used can vary greatly from location to location, and industry to industry. Purveyors of such handheld scanning devices have long sought to provide a widely varied product line of differing configurations having different physical attributes, as well as different approaches to the provision of electric power and communicating scanned data to other devices. Such wide ranging product lines also tend to include a wide assortment of accessories that may be specific to differing ones of such configurations. The intention of these purveyors is to enable a business to select the particular configuration of handheld scanning device that most easily fits in the working environments of their places of business.

However, such ongoing provision of numerous physical, electrical and/or communications configuration, and associated accessories, can quickly become unwieldy for both a purveyor to cost-effectively provide and for their customers to choose from. These problems are rapidly compounded as each new innovation that necessitates a change in the design of such handheld scanning devices causes the design, manufacture and offering of more sets of physical, electrical and/or communications configurations, as well as more sets of associated accessories.

Thus, a system of handheld scanner components of reduced variety and increased flexibility is needed.

SUMMARY OF THE INVENTION

Technologies are described for optical barcode scanning devices, and in particular to a system of a reduced variety of components that enables the provision of multiple useful configurations.

A reader may include a scanning head that comprises an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil disposed at a second end of the elongate handle opposite the first end, and oriented parallel to a first side of the elongate handle, a second handle receiving coil disposed at the second end, and oriented parallel to a second side of the elongate handle that is opposite the first side of the elongate handle, and a battery to provide electric power to the processor and the optical sensor, and configured to be recharged via the first and second handle receiving coils.

A scanning system may include a reader, a charging cradle and a presentation base. The reader may include a scanning head that includes a head receiving coil, an optical sensor to capture an indicia that encodes data, and a processor to interpret the indicia to decode the data. The reader may also include an elongate handle connected at a first end to the scanning head and graspable to orient the optical sensor toward the indicia. The elongate handle may include a handle electrical connector disposed at a second end of the elongate handle opposite the first end, and a first battery to provide electric power to the processor and the optical sensor, wherein the first battery may be configured to be recharged via the head receiving coil or the handle electrical connector. The charging cradle may be configured to receive the scanning head, and may include a cradle transmitting coil configured to wirelessly transmit electric power to the head receiving coil when the scanning head is received in the charging cradle, and a cradle electrical connector to receive the electric power transmitted by the cradle transmitting coil. The presentation base may be configured to be releasably connected to the second end of the elongate handle. When the base is connected to the second end, the presentation base may be configured to support the reader atop a first support surface in a presentation scanning mode, and the presentation base may be configured to engage a second support surface atop which the charging cradle is also supported to orient the head receiving coil into parallel alignment with the cradle transmitting coil to enable charging of the first battery via the cradle transmitting coil.

BRIEF DESCRIPTION OF THE DRAWINGS

FIGS. 4A, 4B, 4C and 4D, collectively referred to herein as FIG. 4, are depictions of a second handheld scanning device configuration of the system of FIG. 1.

FIGS. 6A, 6B and 6C, collectively referred to herein as FIG. 6, are depictions of a fourth handheld scanning device configuration of the system of FIG. 1.

DETAILED DESCRIPTION OF THE INVENTION

Figure 1A:
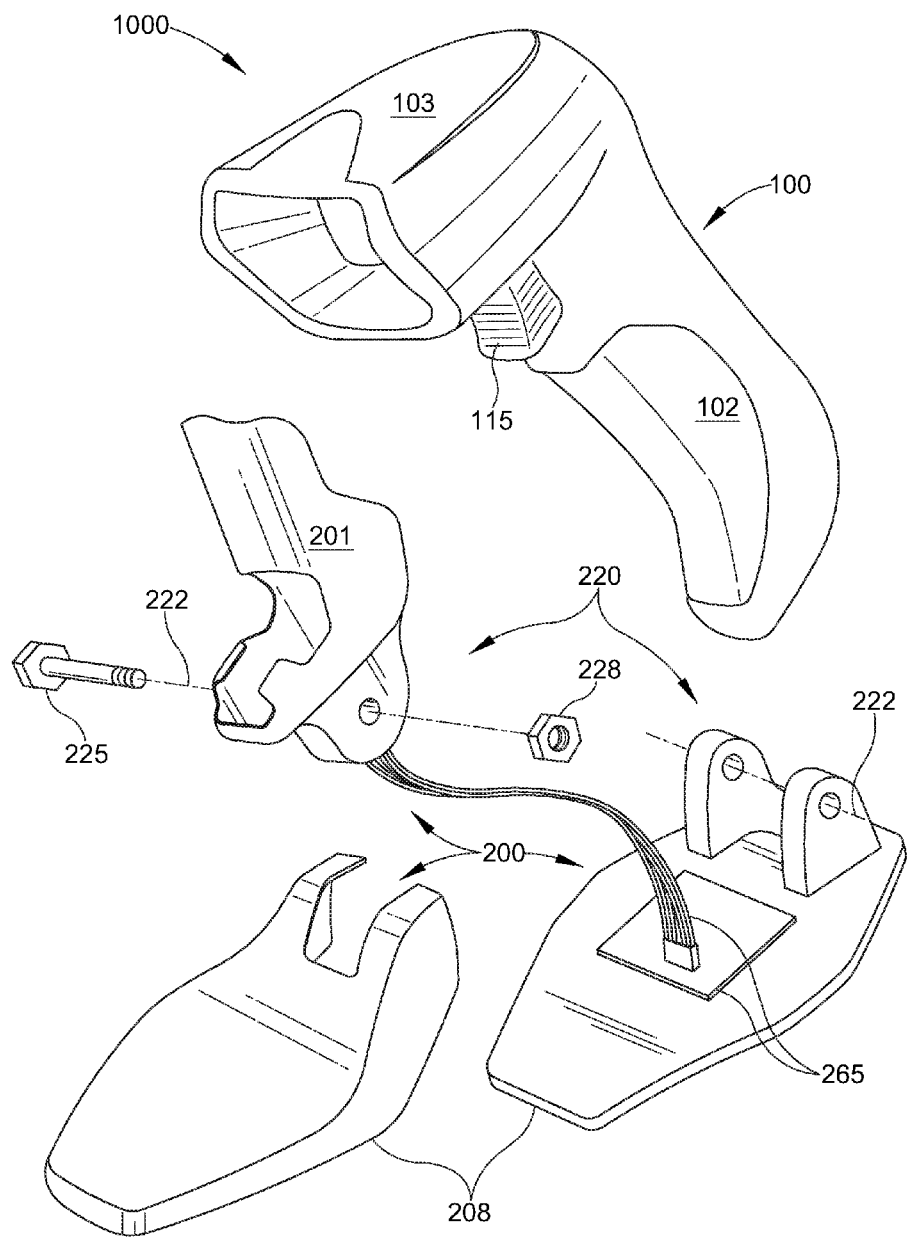
FIGS. 1A, 1B and 1C, collectively referred to herein as FIG. 1, show aspects of a system of handheld scanner components.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a reader to wirelessly collect data and that is wirelessly rechargeable. Generally, the reader includes a scanning head that comprises an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil disposed at a second end of the elongate handle opposite the first end, and oriented parallel to a first side of the elongate handle, a second handle receiving coil disposed at the second end, and oriented parallel to a second side of the elongate handle that is opposite the first side of the elongate handle, and a battery to provide electric power to the processor and the optical sensor, and configured to be recharged via the first and second handle receiving coils.

FIG. 1 depicts aspects of an example embodiment of a system 1000 of handheld scanner components 100, 200, 300 and/or 800 that may be assembled and/or otherwise used together in various ways to provide various physical, electrical and/or communications configurations of a handheld scanning device. Turning more specifically to FIG. 1A, an exploded perspective view is provided of a combination of a reader 100 and a presentation base 200 of the system 1000. As will be described in greater detail, the reader 100 includes a scanning head 103 and an elongate handle 102 connected at one end to the scanning head 103. The reader 100 may be used independently from the presentation base 200 and/or the other components 300 and 800 as a "mobile scanner" having an entirely handheld gun-like physical configuration for being easily carried to various locations and/or used in relatively tight spaces to capture images in which data is encoded, such as one-dimensional and/or two-dimensional barcodes.

Figure 1B:
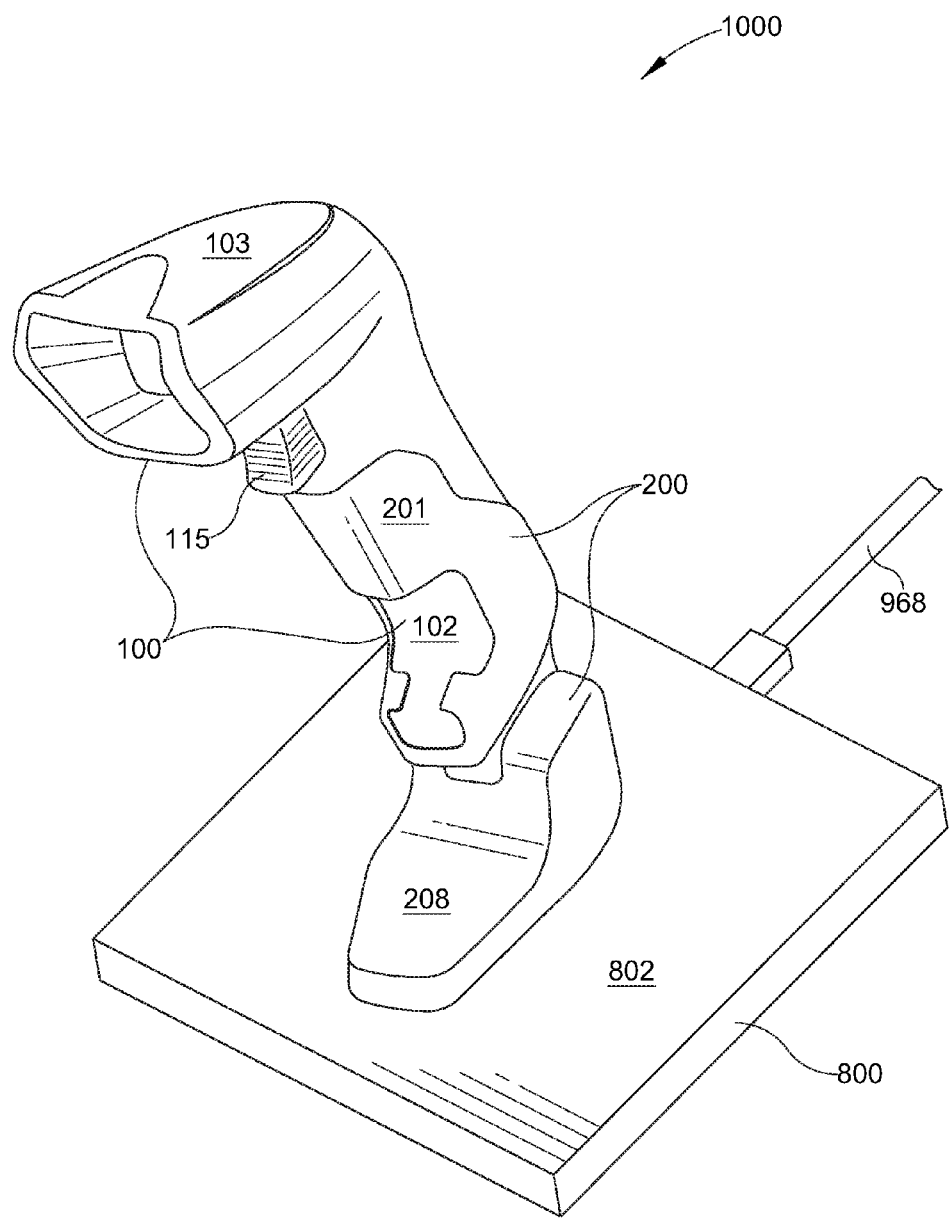

However, and turning more specifically to FIG. 1B, the upper portion 201 of the presentation base 200 is configured to receive and releasably retain a portion of an end of the elongate handle 102 of the reader 100, thereby enabling the reader 100 to also be used in conjunction with the presentation base 200 as a "presentation scanner." When used in this manner, the reader 100 may be kept in a relatively stationary position supported by the presentation base 200 atop a support surface (e.g., a table top, a counter top, or other substantially horizontal support surface). As depicted, the presentation base 200 may be of relatively compact shape and size such that it may not be deemed too encumbering to use the reader 100 in a physical configuration of mobile scanner in which the presentation base 200 is allowed to remain connected to the elongate handle 102 of the reader 100. More precisely, the presentation base 200 may be said to cooperate with the elongate handle 102 of the reader in a manner akin to adding a "foot" to one end of the elongate handle 102 that enables the reader 100 to remain supported in an upright orientation atop a support surface, while not being so large as to tend to encourage personnel to detach the presentation base 200 from the elongate handle 102 at times when the reader 100 is used as a mobile scanner.

Any of a variety of mechanical mechanisms may be employed to releasably retain the elongate handle 102 of the reader 100 within the upper portion 201 of the presentation base 200. By way of example, the elongate handle 102 may be releasably retained within upper portion 201 through use of friction between external surfaces of the elongate handle 102 and interior surfaces of the upper portion 201.

As also depicted, the support surface atop which the reader 100 may be supported, through the presentation base 200, may be a charging pad 800 of the system 1000. As will be explained in greater detail, the charging pad 800 may employ an electromagnetic field to wirelessly convey electric power to the presentation base 200, which in turn, may relay the electric power it wirelessly receives from the charging pad 800 onward to the reader 100 to recharge the reader 100. The ability to so provide electric power to the reader 100 from the charging pad 800 and through the presentation base 200 advantageously allows the reader 100 to be both recharged and used in the physical configuration of a presentation scanner at the same time. Additionally, the fact that the combination of the reader 100 and the presentation base 200 is simply physically supported atop the charging pad 800 without being connected thereto by any form of electrical and/or retentive mechanical connection, and the fact of the relatively compact size of the presentation base 200, may both serve to make easier the occasional use of the reader 100 as a mobile scanner with the presentation base 200 still attached Returning more specifically to FIG. 1A, as depicted in the exploded perspective view, the upper portion 201 and the lower portion 208 of the presentation base 200 may be connected by a hinge portion 220 that enables the upper portion 201 to rotate to some degree relative to the lower portion 208 about a pivot axis 222. In some embodiments, and as also depicted, the hinge portion 220 may include a combination of a bolt 225 and corresponding nut 228 that may cooperate with aligned holes defined by the upper portion 201 and the lower portion 208 to define the pivot axis 222. However, as will be readily recognizable to those skilled in the art, the hinge portion 220 may be formed from any of a variety of hardware components that may be carried by the upper portion 201 and the lower portion 208, and that may interact in any of a variety of ways to enable rotation of the upper portion 201 relative to the lower portion 208. With the elongate handle 102 of the reader 100 inserted and releasably retained within the upper portion 201 of the base 200, the inclusion of the hinge portion 220 interposed between the upper portion 201 and the lower portion 208 enables some degree of pivoting of the reader 100 relative to a support surface atop which the reader 100 may be supported through the presentation base 200.

Figure 1C:
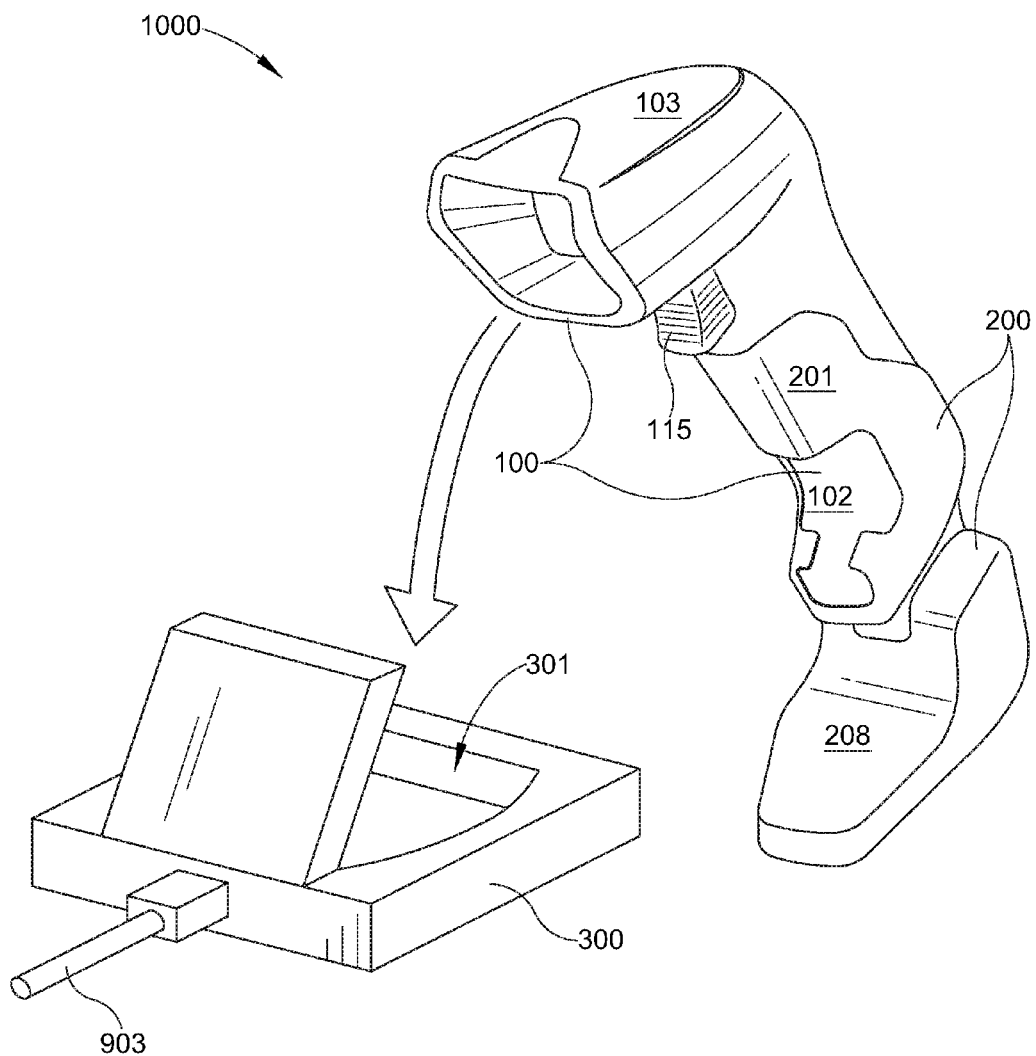

Turning more specifically to FIG. 1C, as an alternative to use of the charging pad 800 to recharge the reader 100 while supported in an upright orientation atop the charging pad 800 by the presentation base 200, the reader 100 may also be charged by insertion of the scanning head 103 into a receptacle 301 of a charging cradle 300 of the system 1000. The receptacle 301 of the charging cradle 301 may be configured to retain a portion of the scanning head 103 therein through use of a friction fit or other mechanism, and this may allow the charging cradle to advantageously be mounted to a wall or other vertical surface to thereby allow the reader 100 to be recharged at a location that does not occupy value table top, counter top or other substantially horizontal surfaces that may be of great value for other uses.

Figure 2A:
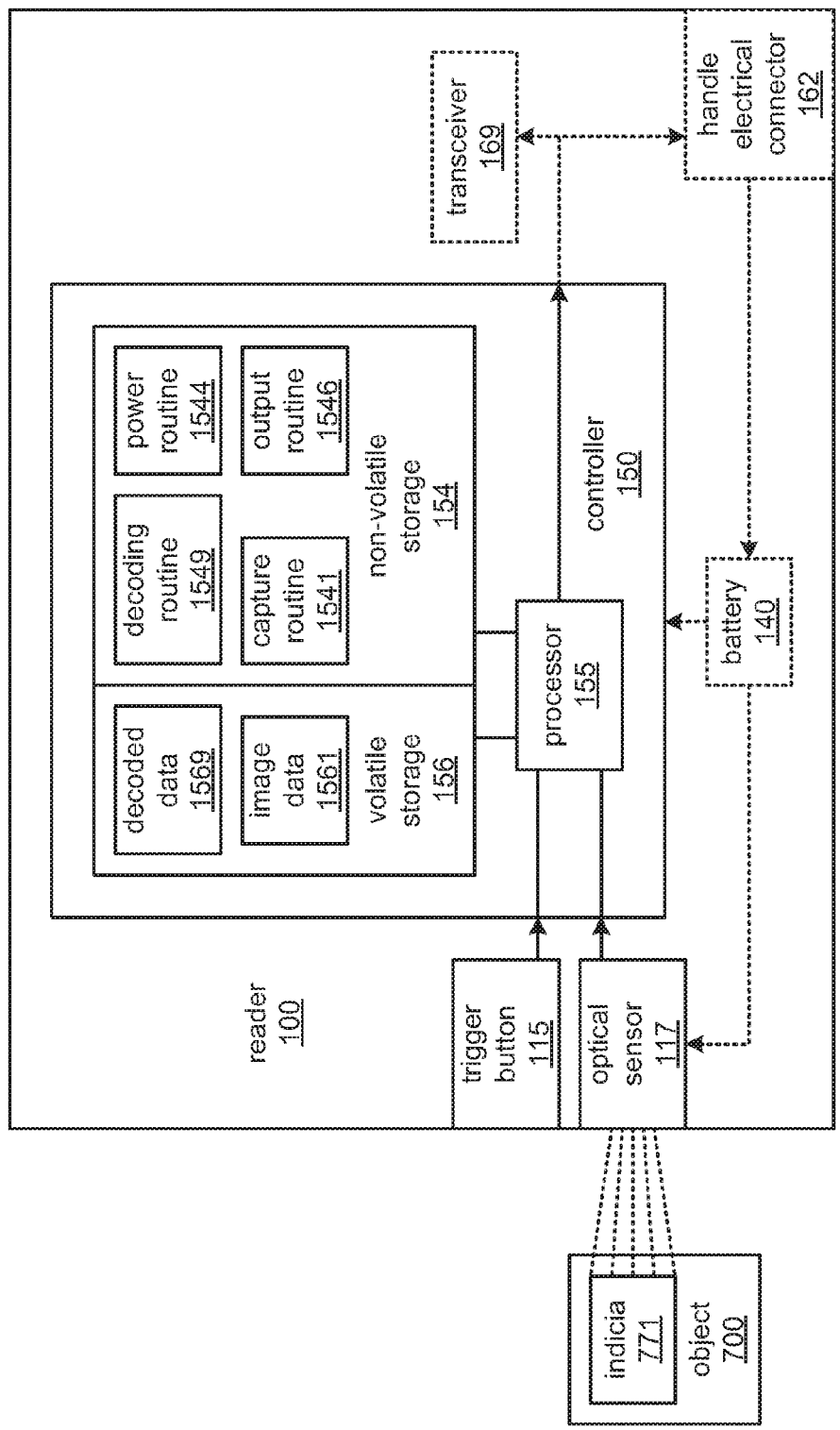
FIGS. 2A, 2B and 2C, collectively referred to herein as FIG. 2, show aspects of an internal architecture of the system of FIG. 1.
Figure 2B:
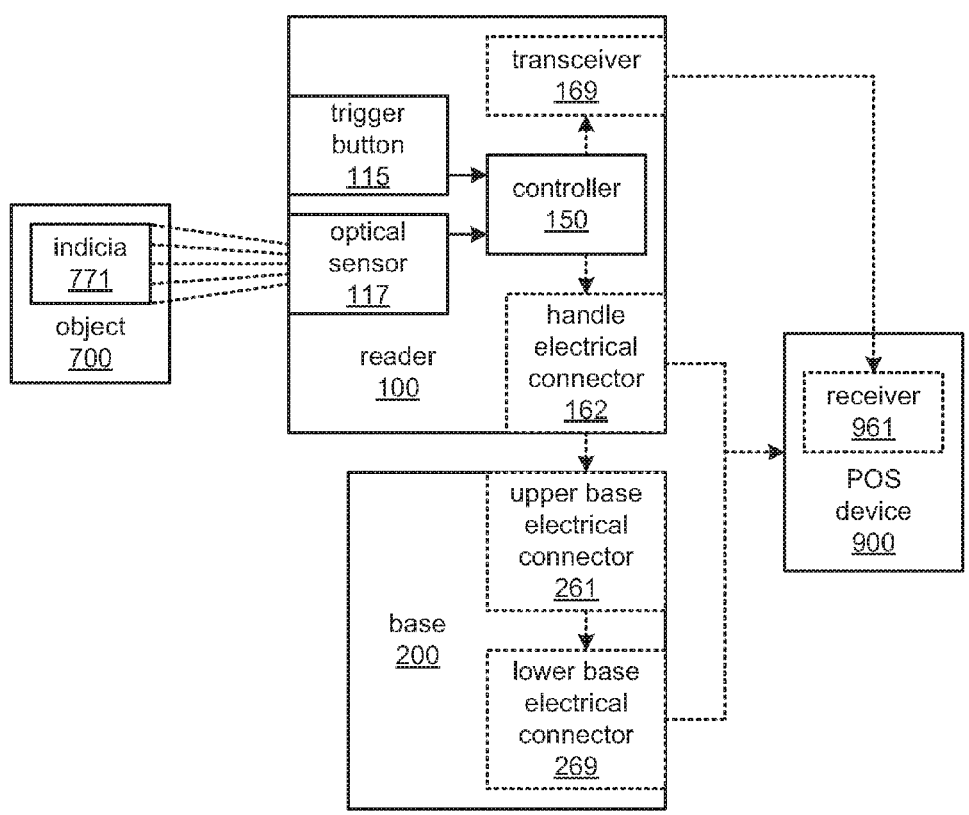
Figure 2C:
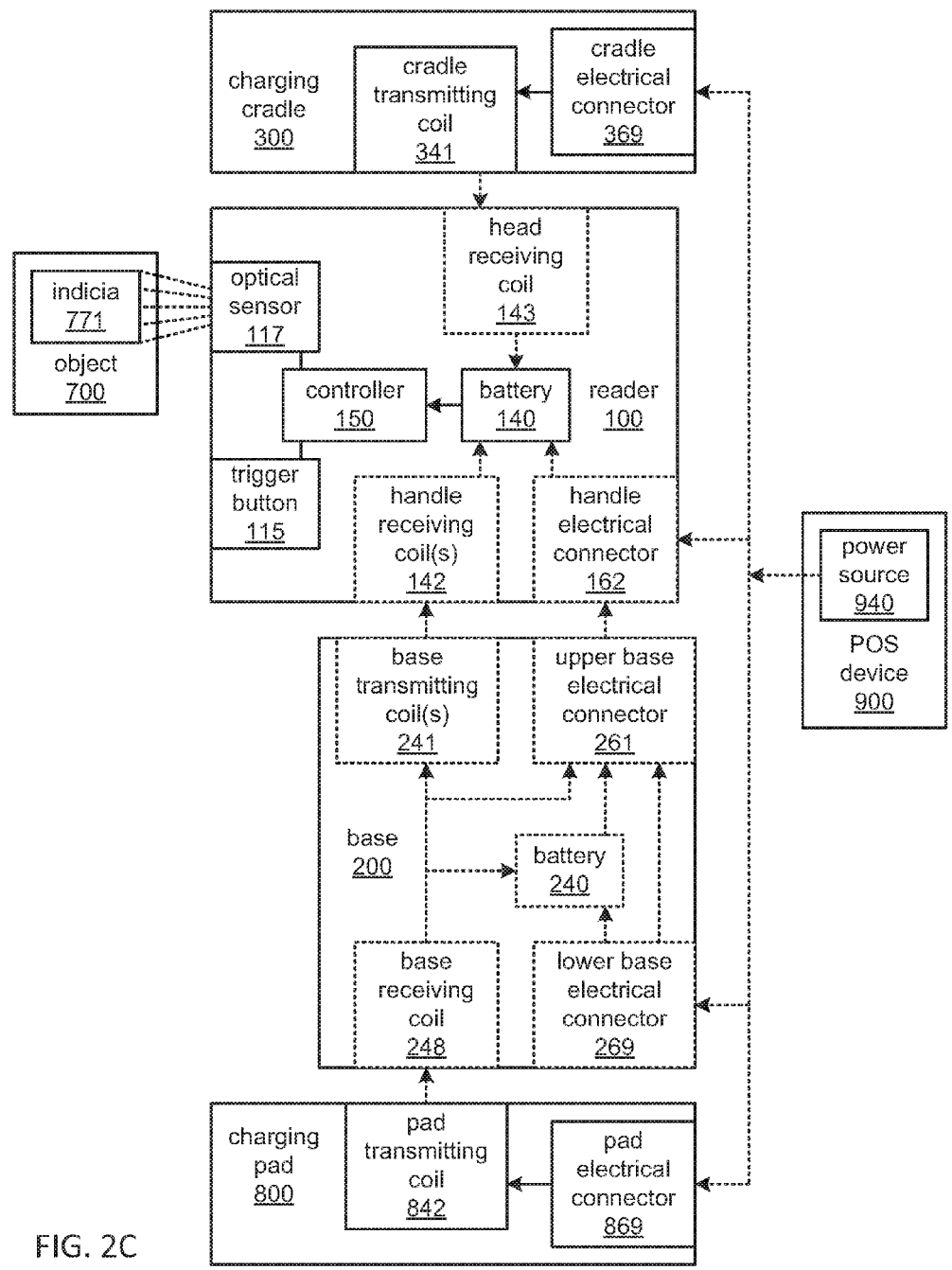

FIG. 2 depicts aspects of an example embodiment of an internal architecture that may be employed among the components 100, 200, 300 and/or 800 of the system 1000 of FIG. 1. More specifically, FIG. 2A provides a block diagram of an embodiment of an internal architecture of the reader 100. FIG. 2B provides a block diagram of various paths by which data may be conveyed from the reader 100 and to a point-of-sale (POS) device 900 (e.g., cash registers, checkout devices, credit card readers, etc.). FIG. 2C provides a block diagram of various ways in which electric power may be conveyed from a power source (e.g., the POS device 900), and through different one(s) of the charging cradle 300, the presentation base 200 and/or the charging pad 800 to recharge a battery 140 of the reader 100.

Turning more specifically to FIG. 2A, the reader 100 may incorporate one or more of a trigger button 115, an optical sensor 117, a battery 140, a handle electrical connector 162 and a transceiver 169. As depicted, the controller 150 may be coupled to the trigger button 115, the optical sensor 117, the battery 140, the handle electrical connector 162 and/or the transceiver 169. The controller may incorporate one or more of a processor 155, volatile storage 156 and non-volatile storage 154. As depicted, the volatile storage may store one or both of image data 1561 and decoded data 1569, and the non-volatile storage may store one or more of a capture routine 1541, a power routine 1544, an output routine 1546 and a decoding routine 1549.

The volatile storage 156 may be based on any of a variety of storage technologies that provide relatively high speeds of access, but which require the continuous provision of electric power to retain any data and/or routines stored therein. Such technologies may include, and are not limited to, random-access memory (RAM), dynamic RAM (DRAM), Double-Data-Rate DRAM (DDR-DRAM), synchronous DRAM (SDRAM), static RAM (SRAM), etc. The non-volatile storage 154 may be based on any of a variety of storage technologies that may not be capable of providing such relatively high speeds of access, but which may be capable of storing with greater density, and capable of retaining data and/or routines stored therein regardless of whether electric power is continuously provided. Such technologies include, and are not limited to, read-only memory (ROM), erasable programmable ROM (EPROM), electrically erasable programmable ROM (EEPROM), flash memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

The processor 155 may include any of a wide variety of processors, microcontrollers, gate-array logic devices, etc. that may be incorporate any of a variety of features to enhance speed and/or efficiency of processing operations. Such features may include and are not limited to, multi-threading support, multiple processing cores, single-instruction multiple-data (SIMD) support, directly integrated memory control functionality, and/or various modes of operation by which speed of throughput and/or level of power consumption may be dynamically altered.

The transceiver 169 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the transceiver 169 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

The handle electrical connector 162 may include electrical contacts by which electric power and/or data transfer signals may be exchanged therethrough and with a mating connector to which the handle electrical connector 162 may be coupled. Additionally, the handle electrical connector 162 may have a physical configuration and/or may be configured to support an exchange of electric power and/or data transmission signals that adhere to one or more known and widely used standards, including and not limited to RS-232C, RS-422, USB, Ethernet (IEEE-802.3) or IEEE-1394

The battery 140 may be coupled to and provide electric power for the operation of the optical sensor 117, the controller 150 and/or the transceiver 169. The battery 140 may be based on any of a wide variety of energy storage technologies to provide energy storage that enables recharging, including and not limited to, nickel-cadmium (NiCd), nickel-metal hydride (NiMH), lithium-ion and/or lithium-polymer.

The optical sensor 117 may be based on any of a variety of technologies and may employ any of a variety of optical scanning and/or other image capturing techniques to capture indicia 771 carried by a portion of an object 700. More specifically, the optical sensor 117 may include any of a variety of light sensing components to effect the capture of an image of the indicia 771, including and not limited to, a charge-coupled device (CCD) providing a single row of individual light sensors operated in a manner that sweeps over the indicia 771 to scan it, or a CCD providing a two-dimensional (2D) array of individual light sensors to capture a 2D image of the optical sensor 117 in a manner akin to a camera.

In some embodiments, the optical sensor 117 may emit various forms of collimated and/or monochromatic light, including light that projects any of a variety of patterns onto a surface of the object 700 that carries the indicia 771. As will be familiar to those skilled in the art will readily recognize, such emission of light may be to provide sufficient illumination to ensure that the indicia 771 is sufficiently visible to be captured, and/or may be provide a visible pattern of markers on a surface of the object 700 and/or the indicia 771 as a guide to determining the orientation of indicia 771 relative to the optical sensor 117 to improve the accuracy with which the data encoded within the indicia 771 may be decoded.

The object 700 may be any of a variety of objects that may carry any of a variety of forms of the indicia 771, including and not limited to, a package carrying a shipping label that includes the indicia 771, or a product for sale within retail packaging on which the indicia 771 is printed as part of the graphical artwork thereof. The indicia 771 may encode data, including and not limited to, data indicating the addresses of the sender and intended recipient of a package, or data providing a universal product code (UPC) that uniquely identifies a product for sale.

Thus, the indicia 771 may be any of a variety of forms of bar code or quick-response (QR) code, including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX;

Telepen; UPC; Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

In some embodiments, in addition to the optical sensor 117, the scanning head may also incorporate a radio-frequency identification (RFID) tag reader to enable RF scanning of RFID tags placed on objects, in addition to or in lieu of the placement of an optically readable indicia 771 on objects. In some embodiments, a single label and/or package associated with an object may carry both an optically readable indicia 771 and a RFID tag.

The processor 155 may access the volatile storage 156 and/or the non-volatile storage 154 to retrieve and/or execute one or more of the routines 1541, 1544, 1546 and 1549 to control various aspects of the operation of the reader 100. In so doing, the processor 155 may be caused to monitor various aspects of the reader 100 and/or of others of the components 200, 300 and/or 800 of the system 1000 with which the reader 100 may interact, and may take various actions in response.

By way of example, the processor 155 may be caused by its execution of the capture routine 1541 to await an indication of manual operation of the trigger button 115, thereby serving to provide a manually entered command to capture an image of and decode the indicia 771. In response, the processor 155 may be caused to operate the optical sensor 117 to so capture an image of the indicia 711, and store the captured image within the volatile storage 156 as the image data 1561.

Such detection of manual operation of the trigger button 115 may also trigger the execution of the decoding routine 1549 by the processor 155. In executing the decoding routine 1549, the processor 155 may be caused to employ any of a variety of algorithms to analyze the captured image of the indicia 771 in the image data 1561 to decode the data that may be encoded within the indicia 771. The processor 155 may then be further caused to store that data within the volatile storage 156 as the decoded data 1569.

Such detection of manual operation of the trigger button 115 may further trigger the execution of the output routine 1546 by the processor 155. In various different embodiments, in executing the output routine 1546, the processor 155 may be caused to operate the transceiver 169 to wirelessly transmit the decoded data 1569 to the POS device 900 (and/or to still another device, not shown). Alternatively or additionally, the processor 155 may be caused to transmit the decoded data 1569 to the POS device 900 (and/or to still another device, not shown) through the handle electrical connector 162.

As depicted in FIG. 2B, the decoded data 1569 may be provided to the POS device 900 through various pathways depending on the features incorporated into the reader 100 and/or on what features are incorporated into the presentation base 200. As just discussed, in embodiments in which the reader 100 incorporates the transceiver 169, the transceiver 169 may be operated to wirelessly transmit the decoded data 1569 to the POS device 900. Alternatively or additionally, in embodiments in which the reader 100 incorporates the handle electrical connector 162, and is not physically coupled to the presentation base 200, the decoded data 1569 may be provided to the POS device 900 via a cable coupled to the handle electrical connector 162 and the POS device 900. As another alternative, in embodiments in which the reader 100 incorporates the handle electrical connector 162, in which the presentation base 200 incorporates both of the depicted base electrical connectors 261 and 269, in which the reader 100 is electrically coupled to the presentation base 200 through the electrical connectors 162 and 261 being connected, and in which the base electrical connectors 261 and 269 of the presentation base 200 are electrically connected therein, the decoded data 1569 may be provided to the POS device 900 via a cable coupled to the lower base electrical connector 269.

Returning to FIG. 2A, the processor 155 may also be caused by execution of the power routine 1544 to monitor the level of electric charge stored within the battery 140. The processor 155 may change one or more aspects of the operation of the reader 100 in response to detecting that the charge stored within the battery 140 is becoming low, thereby implementing one or more lower power and/or power saving modes or states. In such lower power configurations, the processor 155 may reduce its own clock speed and/or speed with which the processor 155 accesses the volatile storage 156. Alternatively or additionally, the processor 155 may lower the brightness of any light emitted by the optical sensor 117. The processor 155 may also respond to an indication that electric power has begun to be provided to the reader 100 from an external source by transitioning the reader 100 back to a higher power state or mode, and/or by controlling the manner in which the battery 140 is recharged by the externally supplied electric power to prevent damage to the battery 140.

Turning to FIG. 2C, as depicted, there may be various pathways offered by the system 1000 for to enable the provision of electric power from a power source 940 of the POS device 900 (and/or from another power source external to the reader 100) and to the reader 100 for purposes of supporting operation of the reader 100 and/or recharging the battery 140 therein. As also depicted, which of such numerous pathways for such provision of electric power are able to be used may also depend on the selection of features that may be incorporated into the reader 100, itself.

For example, in embodiments in which the reader 100 is configured to be recharged when the scanning head 103 is releasably retained within the receptacle 301 of the charging cradle 300, the scanning head 103 of the reader 100 may incorporate a head receiving coil 143. In such embodiments, the head receiving coil 143 may be positioned within the scanning head 103 at a location that brings it into close proximity to a cradle transmitting coil 341 of the charging cradle 300 to enable the wireless provision of electric power to the reader 100 via the coils 341 and 143 while the scanning head 103 is inserted and releasably retained within the receptacle 301. The electric power supplied by the charging cradle 300 to the reader 100 may be provided to the charging cradle from the power source 940 by a cable connecting the POS device 900 to a cradle electrical connector 369 of the charging cradle 300.

In embodiments in which the reader 100 incorporates and is configured to be recharged via the handle electrical connector 162, the electric power so received by the reader 100 through the handle electrical connector 162 may be directly provided to the reader 100 via a cable electrically connected to the handle electrical connector 162 from the POS 900. Alternatively, where the presentation base 200 incorporates both of the upper base electrical connector 261 to engage the handle electrical connector 162, and the lower base electrical connector 269 to enable an electrical connection to the POS device 900 via a cable electrically connected thereto, and where the base electrical connectors 261 and 269 are electrically connected within the presentation base 200 to convey electric power therebetween, the reader 100 may be provided with electric power through the combination of the electrical connectors 162, 261 and 269, and via cable electrically connecting the lower base electrical connector 269 to the POS device 900.

As depicted, in embodiments in which the reader 100 may receive electric power through its handle electrical connector 162 when connected to the upper base electrical connector 261 of the presentation base 200, the presentation base 200 may additionally include a battery 240. In such embodiments, where the presentation base 200 is allowed to remain attached to the reader 100 while the reader 100 may be used as mobile scanner, the battery 240 may serve to assist the battery 140 in providing electrical power for the operation of the reader 100. Also in such embodiments, the battery 240 may be charged along with the battery 140 when electric power is provided to recharge the battery 140 of the reader 100 through the presentation base 200, as by being provided via a cable connected to the lower base electrical connector 269 of the presentation base 200.

In embodiments in which the reader 100 is configured to be wirelessly recharged through the presentation base 200, the reader 100 may incorporate one or more handle receiving coils 142 within the elongate handle 102. The one or more handle receiving coils 142 may be positioned close to and behind external surfaces of the elongate handle 102 that become closely aligned with (and may be engaged by) interior surfaces of the upper portion 201 of the presentation base 200. Corresponding to the one or more handle receiving coils 142, the upper portion 102 of the presentation base 200 may incorporate matching one or more base transmitting coils 241 positioned close to and behind interior surfaces of the upper portion 201 at locations that cause the one or more base transmitting coils 241 to be positioned closely to the handle receiving coils 142 when the elongate handle 102 is received within the upper portion 201 of the presentation base 200. Such use may be made of the coils 241 and 142 to provide electric power for recharging the battery 140 in environments in which there may be dust and/or other environmental contaminants and/or reactive substances that may damage and/or impede the use of electrical contacts as might otherwise be used to provide electric power to the reader 100.

Further, in some of the embodiments in which the combination of one or more of each of the coils 241 and 142 are used to provide electric power from the presentation base 200 to the reader 100, the presentation base 200 may additionally incorporate a base receiving coil 248 positioned closely behind a bottom surface of the lower portion 208 of the presentation base 200 to receive wirelessly conveyed electric power from a pad transmitting coil 842 of the charging pad 800. The presentation base 200 may be configured to convey electric power received via the base receiving coil 248 from the charging pad 800 to the one or more base transmitting coils 241 for being wirelessly conveyed onward to the reader 100. The charging pad 800 may receive the electric power that it so wirelessly conveyed to the presentation base 200 from the POS device 900 via a pad electrical connector 869 incorporated into the charging pad 800 and a cable connecting the POS device 900 thereto.

As still another alternative, the presentation base 200 may incorporate the base receiving coil 248 to wirelessly receive electric power from the charging pad 800, but may incorporate and employ the upper base electrical connector 261 to convey the received electric power onward to the reader 100 via the electrical connectors 261 and 162. In such alternative embodiments, an amount of the electric power wirelessly received via the base receiving coil 248 may be used to also recharge the battery 240 which may subsequently assist the battery 140 of the reader 100 in providing electric power for the operation of the reader 100.

FIG. 3 depicts aspects of embodiments of the hinge portion 220 of the presentation base 200 in greater detail. As previously discussed, the hinge portion 220 may be implemented using any of a variety of hardware components to define a hinge by which the upper portion 201 of the presentation 200 may rotationally move relative to the lower portion 208. FIG. 3B provides a cross-sectional view of one embodiment of the hinge portion 220 along a sectional line A-A in a front elevational view of the combination of the reader 100 and the presentation base 200 provided in FIG. 3A. In the sectional view of FIG. 3B, the pivot axis 222 of the hinge portion 220 can be seen extending straight out from the plane of view of FIG. 3B.

Figure 3A:
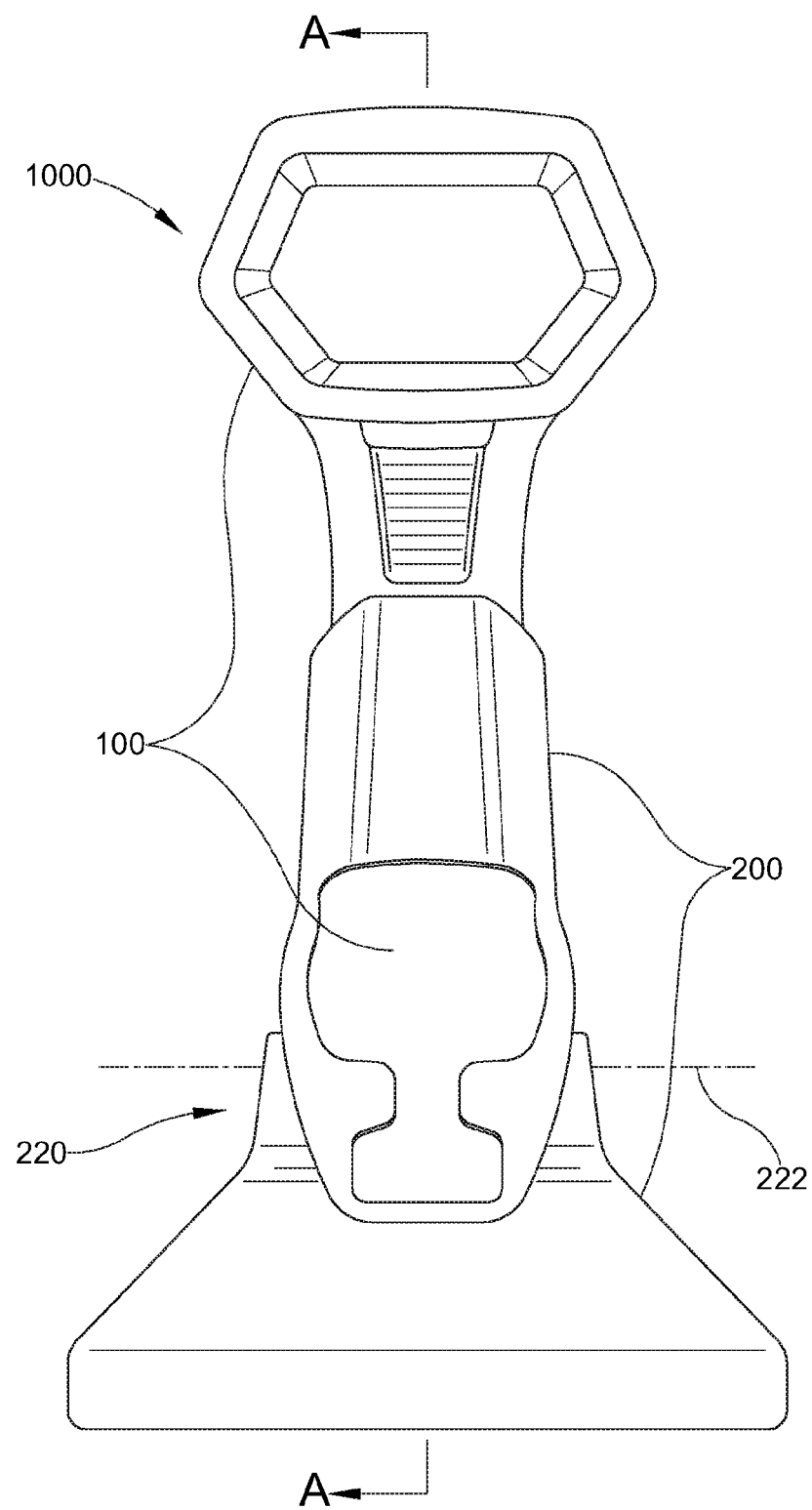
FIGS. 3A, 3B, 3C, 3D and 3E, collectively referred to herein as FIG. 3, are depictions of a first handheld scanning device configuration of the system of FIG. 1.
Figure 3B:
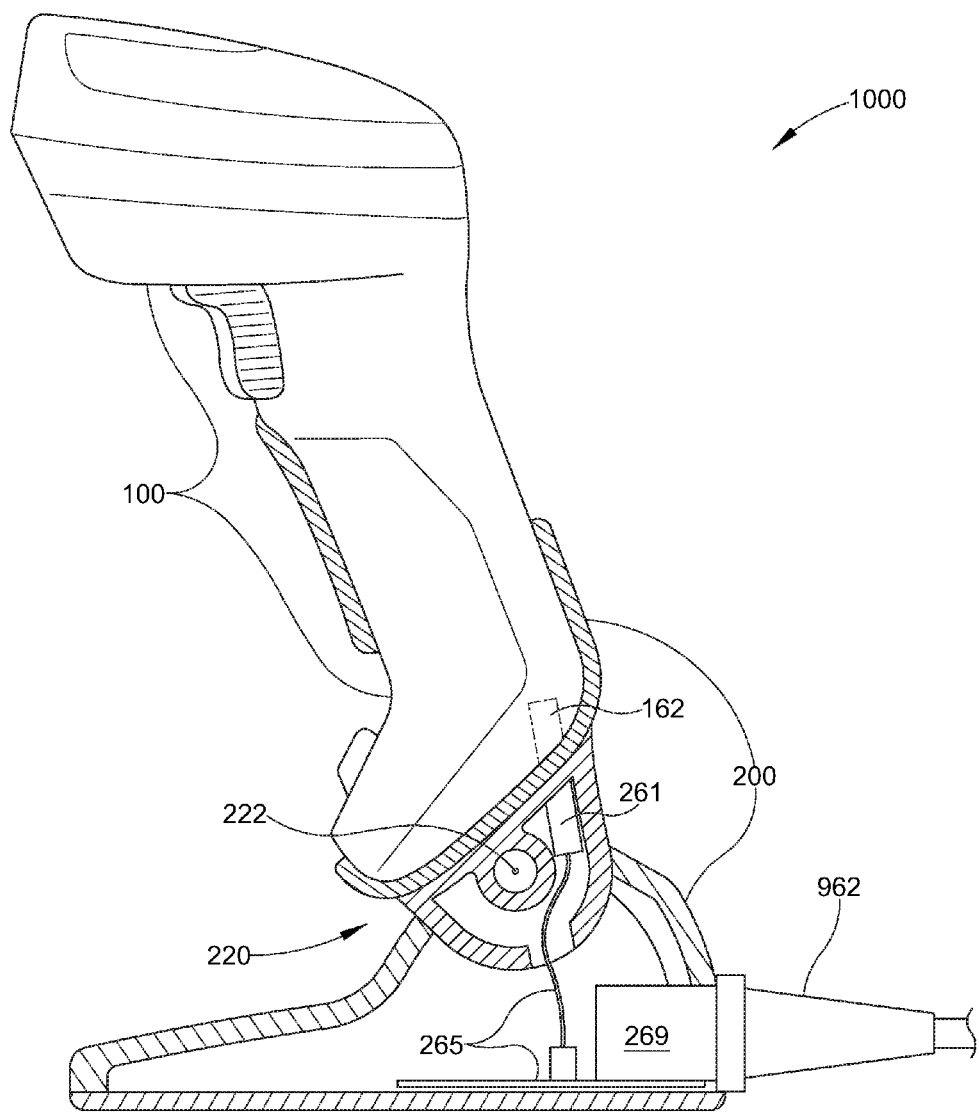

Also directly visible in cross-sectional view of the presentation base 200 in FIG. 3B are the base electrical connectors 269 and 261 incorporated into the lower portion 208 and the upper portion 201, respectively. Additionally directly visible is an embodiment of electrically connective components 265 by which the base electrical connectors 269 and 261 may be electrically connected to each other to enable the conveyance of electric power and/or data signals conveying the decoded data 1569 therebetween. As depicted, the electrically connective components 265 may include a circuitboard onto which the lower base electrical connector 269 may be soldered and/or a ribbon-like electrical cable connecting that circuitboard to the upper base electrical connector 261. Also additionally directly visible is the electrical connection of the lower base electrical connector 269 to a cable 962 that, in turn, may electrically couple the lower base electrical connector 269 to the POS device 900.

Also visible in FIG. 3B as a hidden object indicated with broken lines is the handle electrical connector 162 that may electrically connect with the upper base electrical connector 261 at times when the elongate handle 102 of the reader 100 is inserted and releasably retained within the upper portion 201 of the presentation base 200. Through this connection, electric power and/or data signals conveying the decoded data 1569 may be conveyed through all three of the electrical connectors 162, 261 and 269, and thereby between the reader 100 and the POS device 900.

Figure 3C:
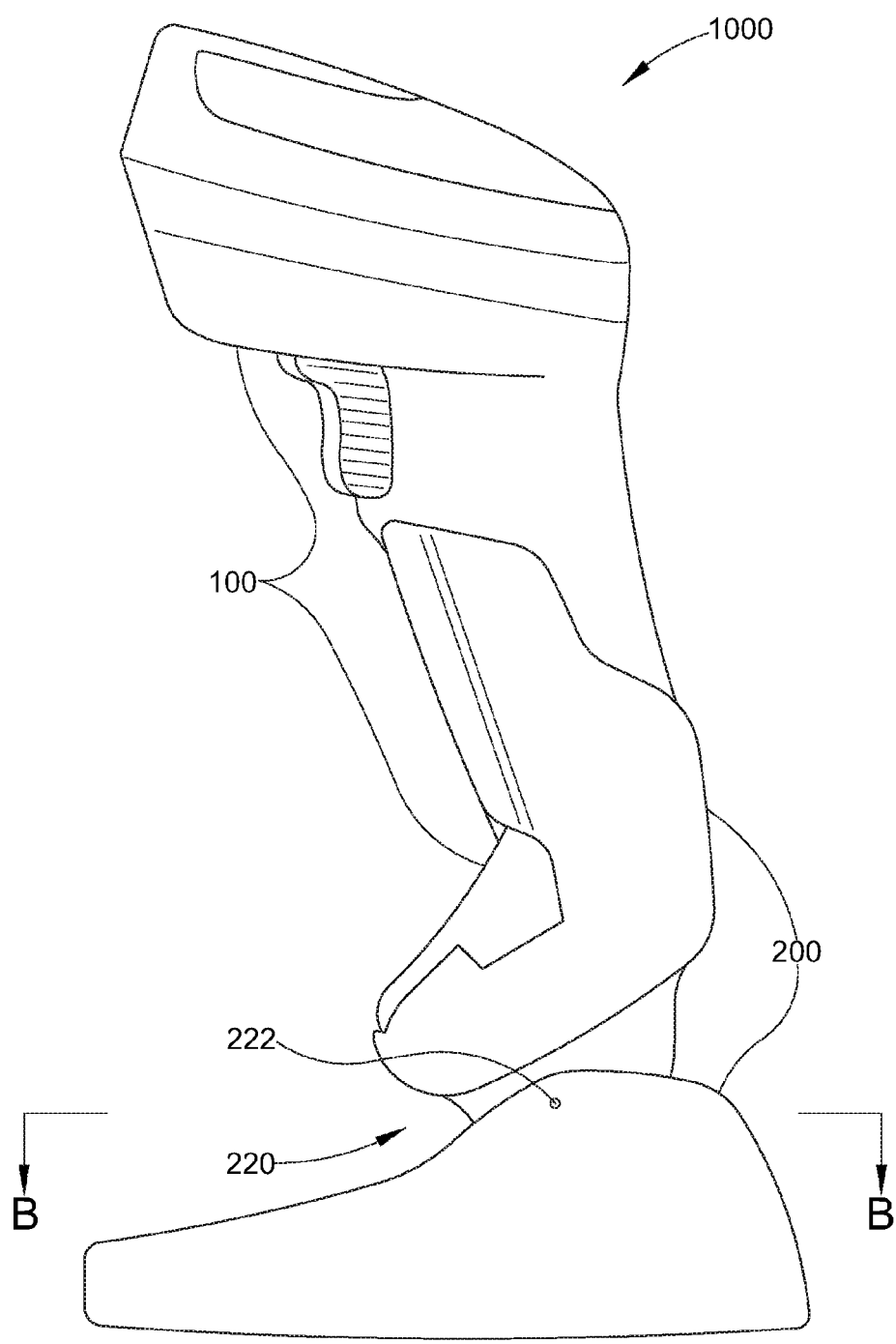
Figure 3D:
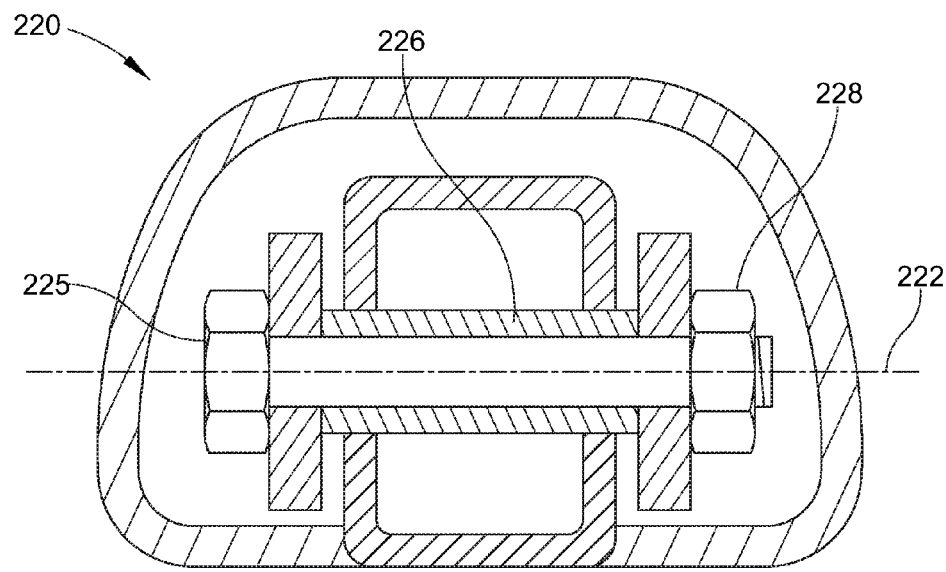
Figure 3E:
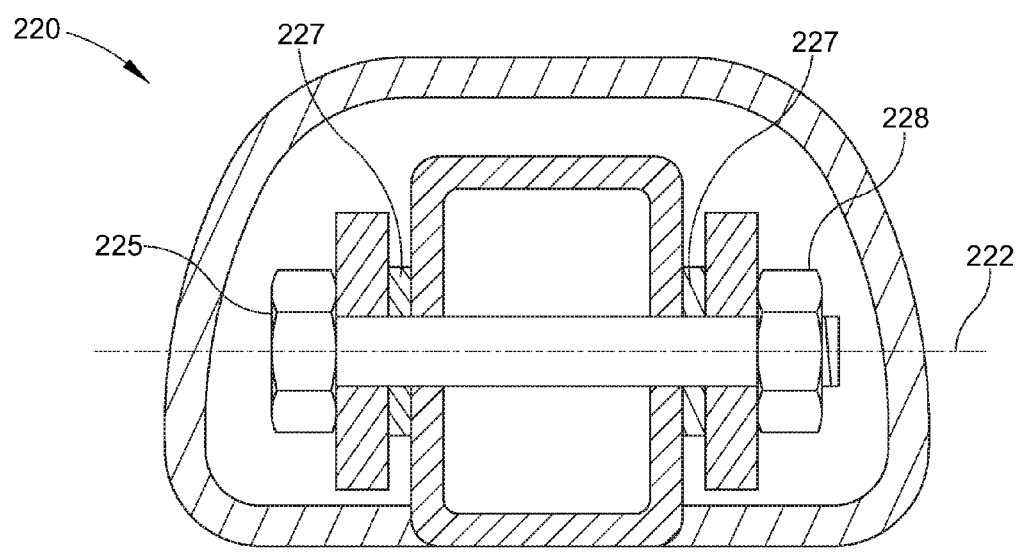

Each of FIGS. 3D and 3E provides a cross-sectional view of an embodiment of the hinge portion 220 along a sectional line B-B in a side elevational view of the combination of the reader 100 and the presentation base 200 provided in FIG. 3C. In each of the sectional views FIGS. 3D and 3E a different combination of hardware components is depicted as implementing the hinge portion 220. More specifically, in FIG. 3D, a tubular bushing 226 made from material selected to impart a degree of smoothness in the bending of the hinge portion 220 is sleeved over a portion of the bolt 225. In contrast, in FIG. 3E, a pair of disc-shaped bushings 227 also made from material selected to impart a degree of smoothness in the bending of the hinge portion 220 may be installed along different portions of the length of the bolts 225.

Figure 4A:
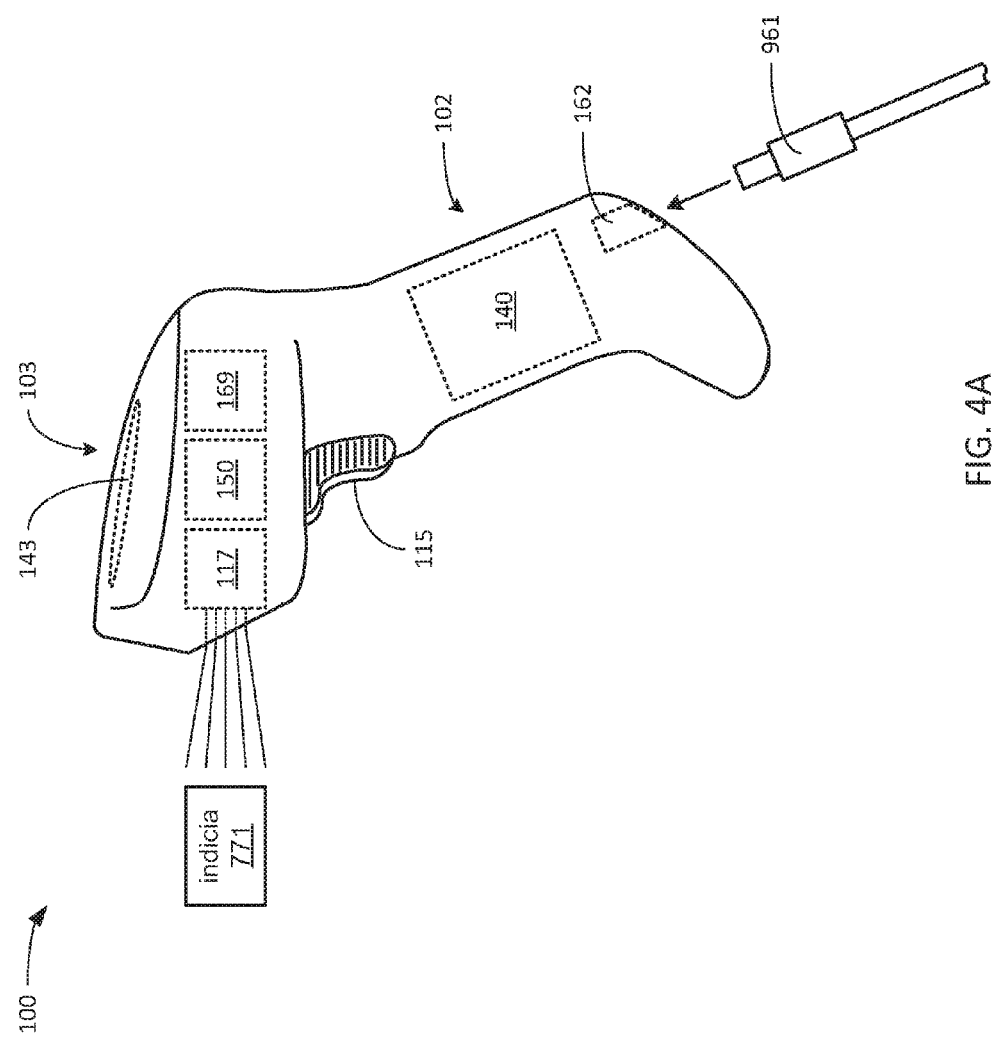

FIG. 4 depicts aspects of an embodiment of the system 1000 in which the reader 100 may incorporate the head receiving coil 143 to support recharging of the battery 140 via the charging cradle 300, and the handle electrical connector 162 to support recharging of the battery 140 via an electrical connection to the handle electrical connector 162 (e.g., via the depicted electrical cable 961 of the POS device 900). As depicted in FIG. 4A, the head receiving coil 143 may be positioned close to and just behind an uppermost exterior surface of the scanning head 103, while the handle electrical connector 162 may be positioned within the end of the elongate handle 102 to mate with the upper base electrical connector 261 within the upper portion 201 of the presentation base 200 (as was depicted in the sectional view of FIG. 3B) when the reader 100 and the presentation base 200 are coupled.

Figure 4B:
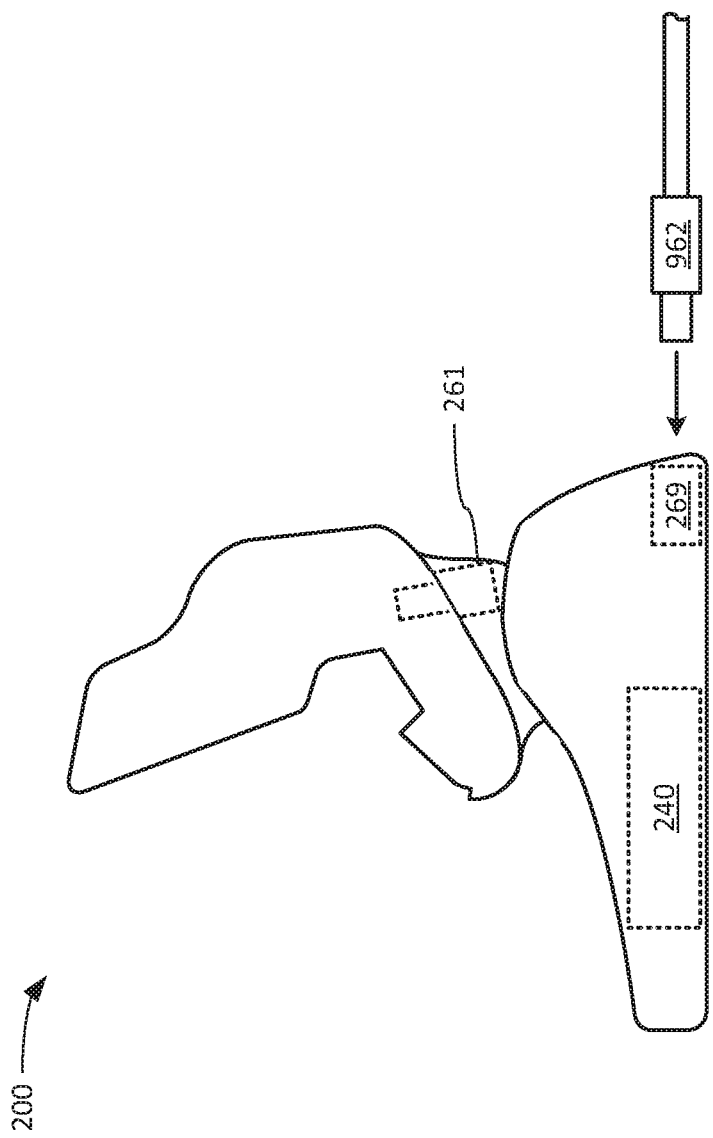

FIG. 4B similarly echoes the positioning depicted in the section view of FIG. 3B of the base electrical connectors 261 and 269 within the presentation base 200. However, FIG. 4B additionally depicts the battery 240 that may additionally be incorporated into the presentation base 200 as being disposed within the lower portion 208 at a bottom-most location where the battery 240 may provide the presentation base 200 with a lower center of gravity, thereby increasing the stability of the presentation base 200 in physically supporting the reader 100 atop a substantially horizontal support surface atop which the presentation base 200, itself, may be supported.

As depicted in FIGS. 4C and 4D, the cradle transmitting coil 341 of the charging cradle 300 may be positioned adjacent the receptacle 301 of the charging cradle 300 such that it becomes closely aligned with the head receiving coil 143 of the reader 100 when the scanning head 103 of the reader 100 is inserted into the receptacle 301. Additionally, as depicted in FIG. 4D, when the scanning head 103 of the reader 100 is so inserted into the receptacle 301, such close alignment of the coils 341 and 143 may be aided and/or improved if the presentation base 200 is still releasably connected to the elongate handle 102 when the scanning head 103 is so inserted. More specifically, a part of the lower portion 208 that extends in a direction generally parallel to the direction in which the scanning head extends to enter into the receptacle 301 may engage the same support surface 20 that supports the charging cradle 300. Such engagement with the support surface 20 may cause the elongate handle 102 of the reader 100 to be pushed by a small distance further away from the support surface 20, to thereby cause a small amount of pivoting of the scanning head 103 within the confines of the receptacle 301, and thereby slightly rotate the head receiving coil 143 into a closer-spaced and more parallel alignment with the cradle transmitting coil 341.

As previously discussed, the charging cradle 300 either may be supported atop a horizontal form of the support surface 20 or may be mounted by mechanical fasteners, adhesive and/or in other ways to a vertical form of the support surface 20. The engagement of the outwardly extending part of the lower portion 208 of the presentation base 200 may achieve the same improvement in alignment between the coils 143 and 341, regardless of whether the support surface 20 is oriented horizontally or vertically.

FIG. 5 depicts aspects of an embodiment of the system 1000 in which the reader 100 may incorporate a pair of the handle receiving coils 142 in lieu of at least the handle electrical connector 162 to support wireless recharging of the battery 140 from electric power provided wirelessly by the presentation base 200. As depicted in FIGS. 5A and 5B, the pair of handle receiving coils 142 may be positioned close to and just behind oppositely facing external surfaces of the elongate handle 102 at a location close to the end that is received within the upper portion 201 of the presentation base 200. In some embodiments, advantage may be taken of the fact that the battery 140 may be co-located with the handle receiving coils 142 within the same general part of the elongate handle 102 to configure the battery 140 to carry the pair of handle receiving coils 142 on opposite sides of the battery 140. This may be deemed electrically advantageous as the combination of the battery 140 and the pair of handle receiving coils 142 may additionally incorporate the electronics required to generate a DC current flow for the recharging of the battery 140 from the pair of handle receiving coils 142.

Figure 5A:
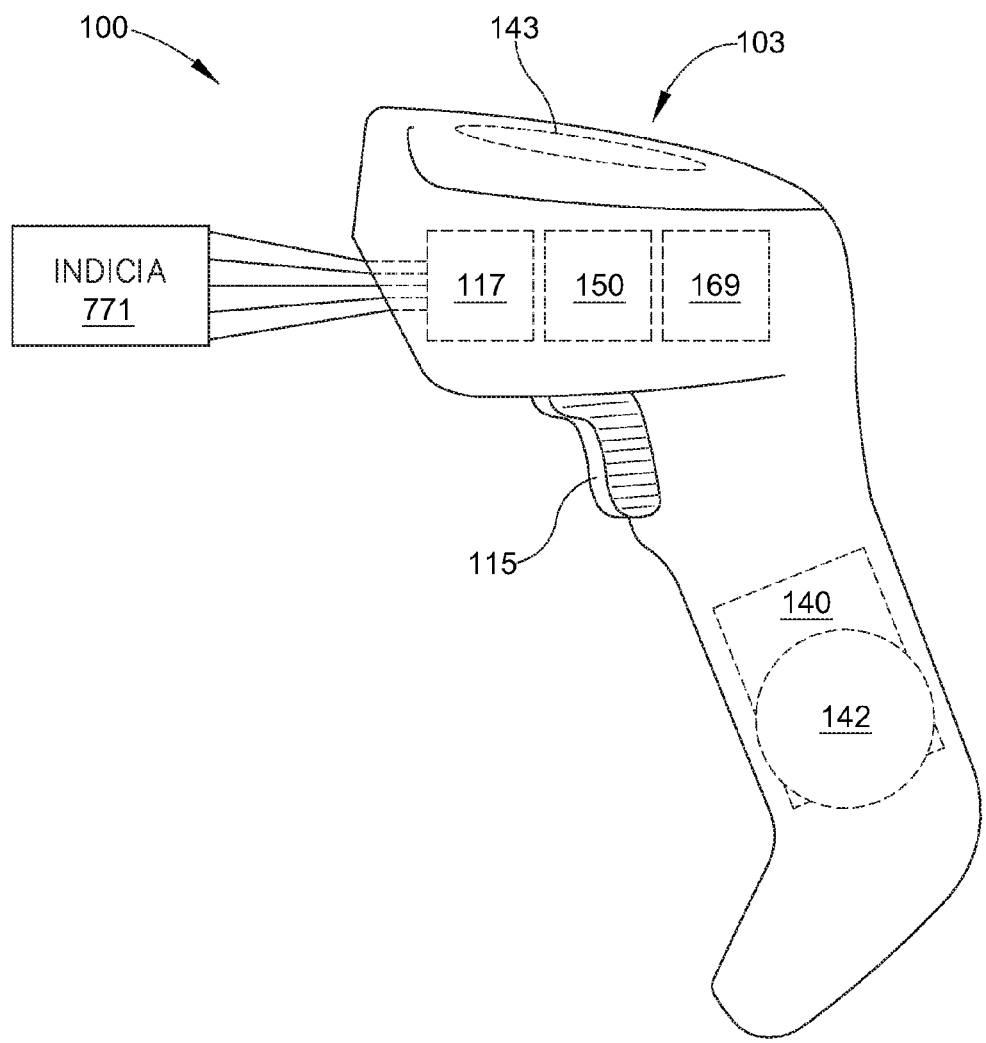
FIGS. 5A, 5B, 5C, 5D and 5E, collectively referred to herein as FIG. 5, are depictions of a third handheld scanning device configuration of the system of FIG. 1.
Figure 5B:
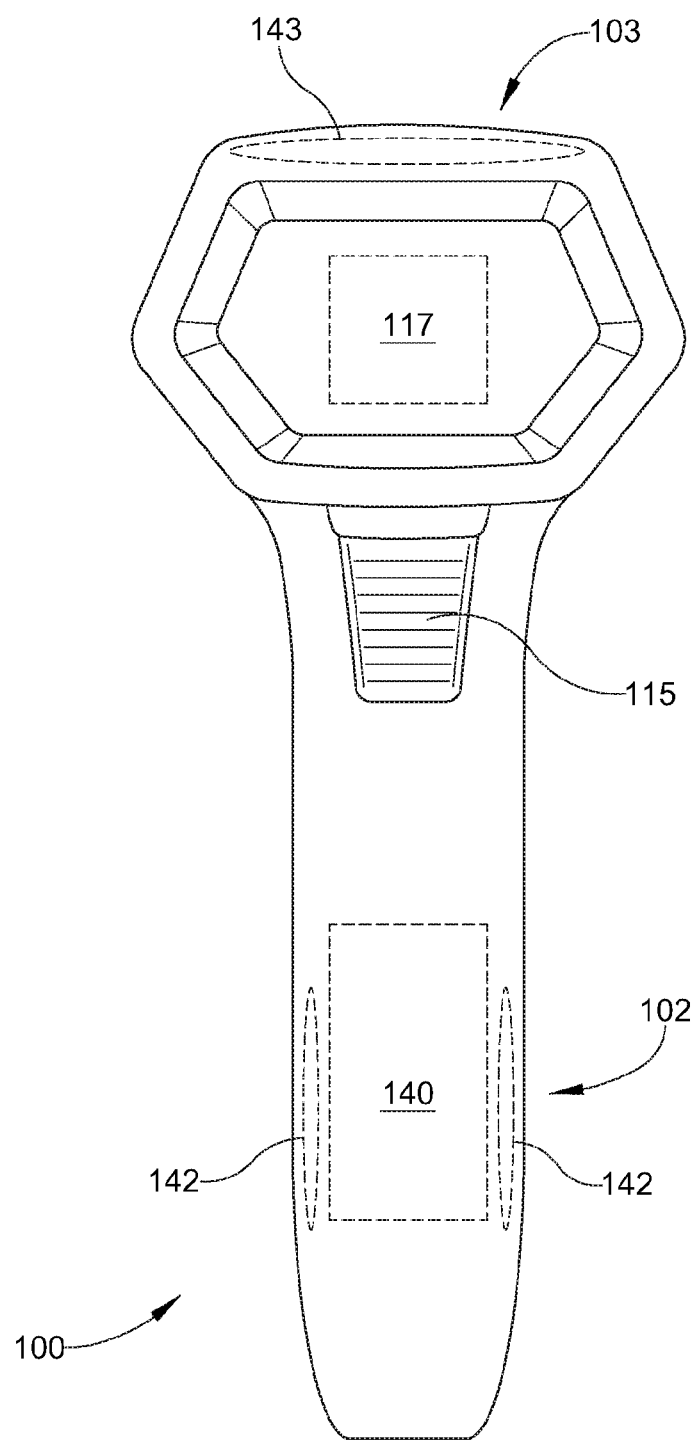
Figure 5C:
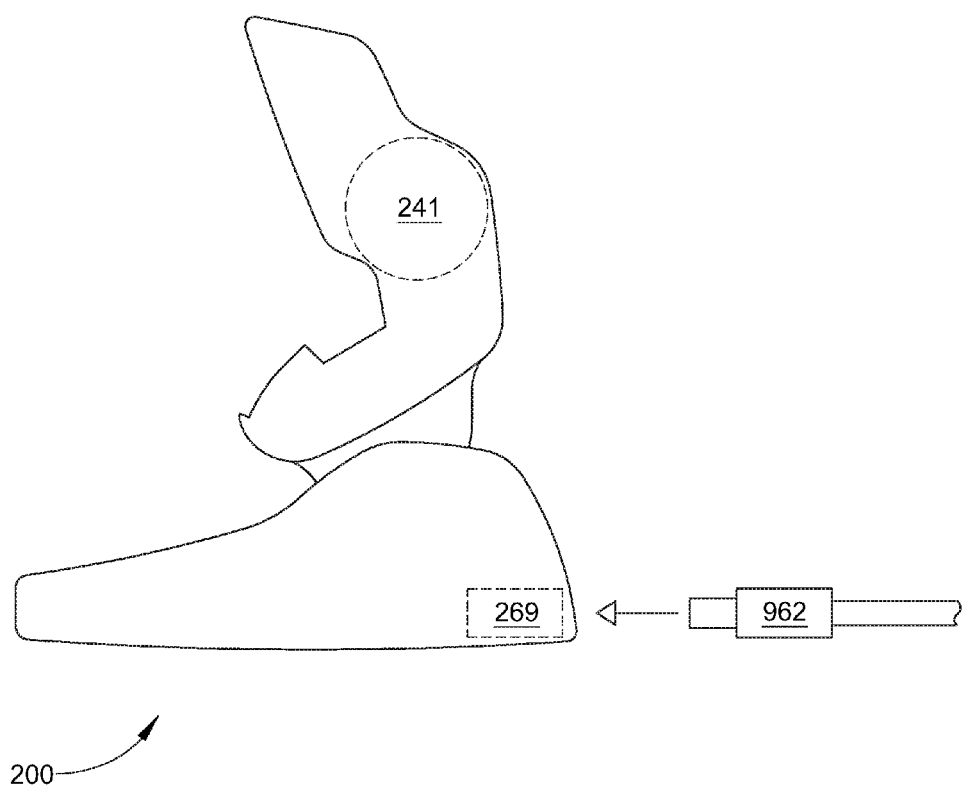
Figure 5D:
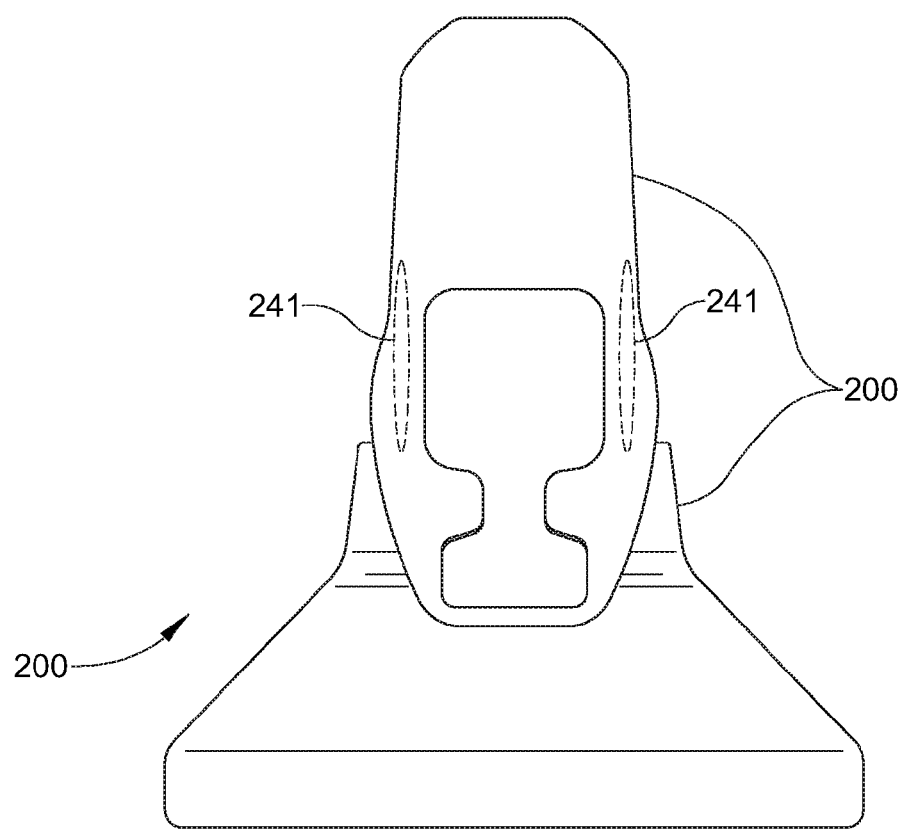
Figure 5E:
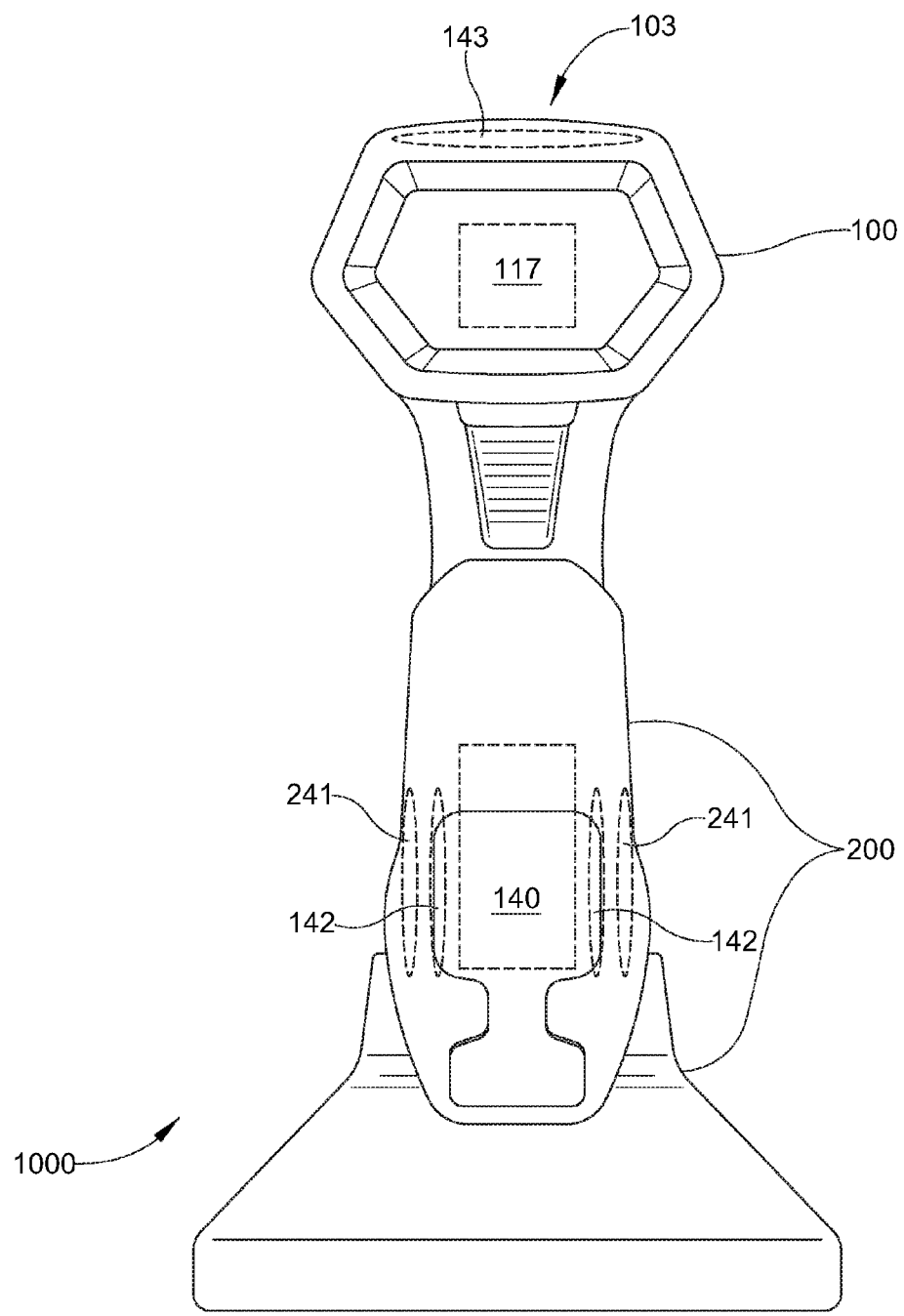

As depicted in FIGS. 5C and 5D, the pair of base transmitting coils 241 may be positioned within opposed walls of the upper portion 201 of the presentation base 200. Such positioning may be selected to cause each of the base transmitting coils 241 to become closely aligned with one of the handle receiving coils 142 when the elongate handle 102 of the reader 100 is inserted into and releasably retained within the upper portion 201, as depicted in FIG. 5E.

It should be noted that the use of a pair of the handle receiving coils 142, within the elongate handle 102 may be deemed more desirable than a single one of the handle receiving coils 142 due to the relatively small amount of surface area of any relatively flat surface that may be provided by the shape of exterior of the elongate handle 102. As familiar to those skilled in the art, the amount of coextending parallel surface area between a transmitting coil and a receiving coil may be the main factor in determining how much electric power is able to be conveyed therebetween.

Figure 6A:
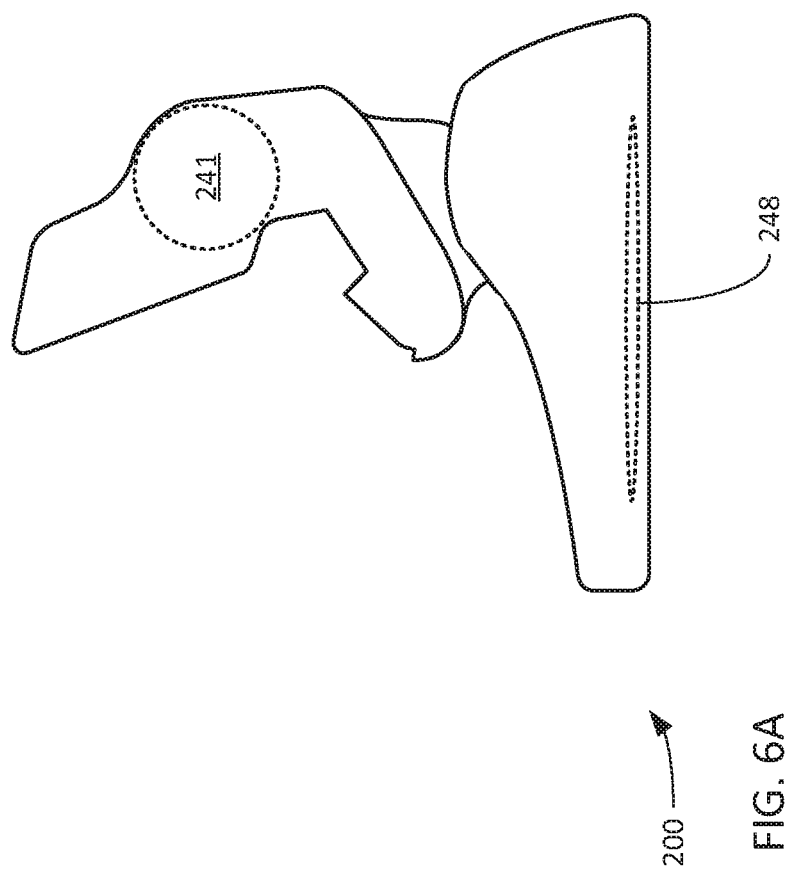
Figure 6B:
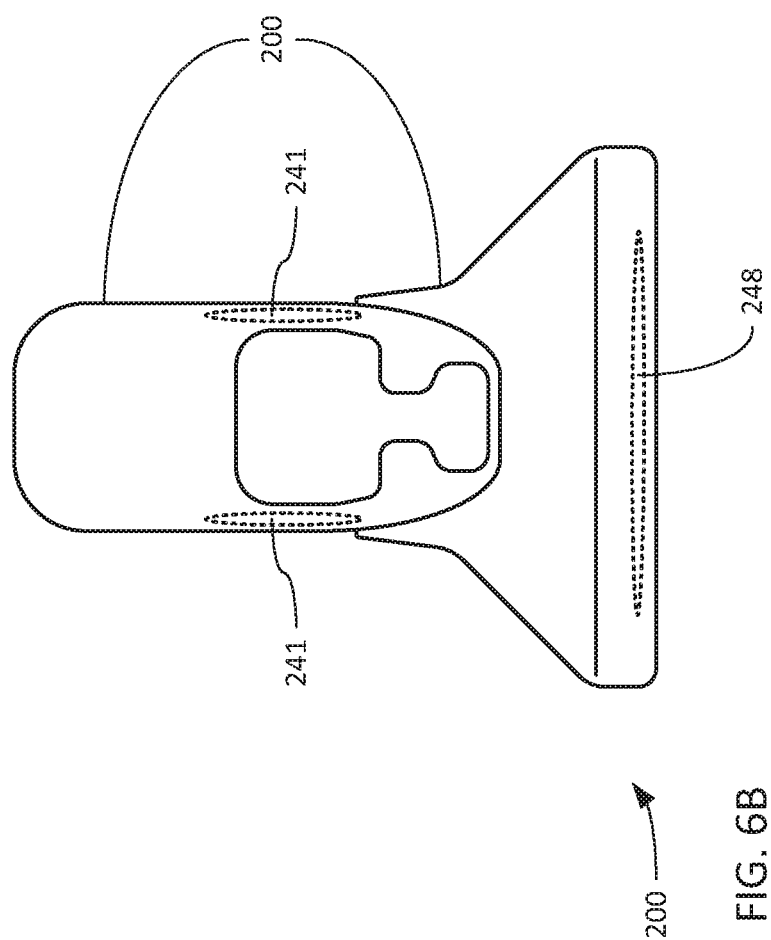

FIG. 6 depicts aspects of an embodiment of the system 1000 in which, in addition to the reader 100 incorporating the pair of the handle receiving coils 142 as discussed in reference to FIG. 5, the presentation base 200 may incorporate the base receiving coil 248 in lieu of at least the lower base electrical connector 269 to support the provision of electric power to the presentation base 200 from the charging pad 800. As depicted in FIGS. 6A and 6B, the base receiving coil 248 may be positioned close to and just behind the bottom-most surface of the presentation base 200 by which the presentation base 200 may be supported atop a support surface, such as the support surface 20 or the charging pad 800.

As depicted in FIG. 6C, with such an embodiment of the presentation base 200 supported atop the charging pad 800, the base receiving coil 248 is put into close and parallel alignment with the pad transmitting coil 842 of the charging pad 800. As also depicted, the charging pad 800 may receive the electric power that it wirelessly conveys to the presentation base 200 via the pad electrical connector 869 and a cable 968 connected thereto that is also connected to the POS device 900.

In some embodiments, the base receiving coil 248 and/or other aspects of the manner in which the presentation base 200 wirelessly receives electric power may be configured to adhere to one or more industrial standards for the wireless transmission of electric power promulgated by the Wireless Power Consortium of Piscataway, N.J., USA. This may be done based on a presumption that at least the majority of implementations of the charging pad 800 atop which the presentation base 200 may be supported may generate an electromagnetic field for the wireless transmission of electric power in a manner that conforms to specifications for one or more of such standards.

There is thus disclosed a reader to capture encoded data. A reader may include a scanning head that comprises an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil disposed at a second end of the elongate handle opposite the first end, and oriented parallel to a first side of the elongate handle; a second handle receiving coil disposed at the second end, and oriented parallel to a second side of the elongate handle that is opposite the first side of the elongate handle; and a battery to provide electric power to the processor and the optical sensor, and configured to be recharged via the first and second handle receiving coils.

The second end of the elongate handle may be configured to be releasably connected to a presentation base. The presentation base may be configured to support the reader atop a support surface in a presentation scanning mode that orients the optical sensor to capture the indicia on an object also supported atop the support surface. The presentation base may include a first base transmitting coil configured to be oriented parallel to the first handle receiving coil and to transmit electric power to the first handle receiving coil when the presentation base is releasably connected to the second end of the elongate handle, and a second base transmitting coil configured to be oriented parallel to the second handle receiving coil and to transmit electric power to the second handle receiving coil when the presentation base is releasably connected to the second end of the elongate handle.

The presentation base may include a first lower base electrical connector that is configured to convey, to the first and second base transmitting coils, the electric power transmitted by the first and second base transmitting coils to the first and second handle receiving coils, respectively.

The presentation base may include a base receiving coil configured to receive electric power wirelessly transmitted to the presentation base by a pad transmitting coil of a charging pad and to convey the wirelessly received electric power to the first and second base transmitting coils to be transmitted to the first and second handle receiving coils, respectively, when the presentation base is supported atop the charging pad as the support surface in the presentation mode.

The first and second handle receiving coils may be carried on opposite sides of the battery.

The reader may further include a head receiving coil disposed in the scanning head to wirelessly receive electric power transmitted by a cradle transmitting coil of a charging cradle when the scanning head is received in the charging cradle, and the battery may be further configured to be recharged by via the head receiving coil.

The second end of the elongate handle may be configured to be releasably connected to a presentation base, and the presentation base may be configured to engage a support surface atop which the charging cradle is also supported to orient the head receiving coil into parallel alignment with the cradle transmitting coil to enable charging of the battery via the cradle transmitting coil.

The reader may further include a data transmitter operable by the processor to wirelessly transmit the decoded data to a point-of-sale device, wherein the battery is configured to provide electric power to the data transmitter.

The reader may further include a radio frequency identification (RFID) sensor to capture wirelessly transmitted data from a RFID tag.

A scanning system may include a reader, a charging cradle and a presentation base. The reader may include a scanning head that includes a head receiving coil, an optical sensor to capture an indicia that encodes data, and a processor to interpret the indicia to decode the data. The reader may also include an elongate handle connected at a first end to the scanning head and graspable to orient the optical sensor toward the indicia. The elongate handle may include a handle electrical connector disposed at a second end of the elongate handle opposite the first end, and a first battery to provide electric power to the processor and the optical sensor, wherein the first battery may be configured to be recharged via the head receiving coil or the handle electrical connector. The charging cradle may be configured to receive the scanning head, and may include a cradle transmitting coil configured to wirelessly transmit electric power to the head receiving coil when the scanning head is received in the charging cradle, and a cradle electrical connector to receive the electric power transmitted by the cradle transmitting coil. The presentation base may be configured to be releasably connected to the second end of the elongate handle. When the base is connected to the second end, the presentation base may be configured to support the reader atop a first support surface in a presentation scanning mode, and the presentation base may be configured to engage a second support surface atop which the charging cradle is also supported to orient the head receiving coil into parallel alignment with the cradle transmitting coil to enable charging of the first battery via the cradle transmitting coil.

The scanning head may further include a data transmitter operable by the processor to wirelessly transmit the decoded data to a point-of-sale device, and the first battery may be configured to provide electric power to the data transmitter.

The processor may be configured to transmit the decoded data to a point-of-sale device through the handle electrical connector.

The scanning head may further include a radio frequency identification (RFID) sensor to capture wirelessly transmitted data from a RFID tag.

The presentation base may be configured to support the reader in the presentation scanning mode with the elongate handle oriented to extend within less than 30 degrees of a vertical orientation, and with the optical sensor oriented to capture the indicia on an object also supported atop the first support surface.

The presentation base may include an upper base electrical connector configured to mate with the handle electrical connector when the presentation base is releasably connected to the second end of the elongate handle, and a second battery to provide electric power to the reader through the handle electrical connector and the upper base electrical connector when the handle electrical connector and the upper base electrical connector are mated.

The presentation base may include a an upper base electrical connector configured to mate with the handle electrical connector when the presentation base is releasably connected to the second end of the elongate handle, and a lower base electrical connector that is electrically connected to the upper base electrical connector and is configured to convey electric power received at the lower base electrical connector to the reader through the handle electrical connector and the upper base electrical connector when the handle electrical connector and the upper base electrical connector are mated.

The presentation base may include a an upper base electrical connector configured to mate with the handle electrical connector when the presentation base is releasably connected to the second end of the elongate handle. The presentation base may further include a base receiving coil configured to receive electric power wirelessly transmitted to the presentation base by a pad transmitting coil of a charging pad when the presentation base is supported atop the charging pad as the first support surface in the presentation mode, and configured to convey the wirelessly received electric power to the reader through the handle electrical connector and the upper base electrical connector when the handle electrical connector and the upper base electrical connector are mated.

The elongate handle may include a first handle receiving coil toward the second end of the elongate handle, and oriented parallel to a first side of the elongate handle. The first battery may be further configured to be recharged via the first handle receiving coil. The presentation base may include a first base transmitting coil configured to be oriented parallel to the first handle receiving coil and to transmit electric power to the first handle receiving coil when the presentation base is releasably connected to the second end of the elongate handle.

The elongate handle may include a second handle receiving coil toward the second end of the elongate handle, and oriented parallel to a second side of the elongate handle that is opposite the first side of the elongate handle. The first battery may be further configured to be recharged via the second handle receiving coil. The presentation base may include a second base transmitting coil configured to be oriented parallel to the second handle receiving coil and to transmit electric power to the second handle receiving coil when the presentation base is releasably connected to the second end of the elongate handle.

The presentation base may include a base receiving coil configured to receive electric power wirelessly transmitted to the presentation base by a pad transmitting coil of a charging pad when the presentation base is supported atop the charging pad as the first support surface in the presentation mode, and configured to convey the wirelessly received electric power to the reader through the first base transmitting coil when the presentation base is releasably connected to the second end of the elongate handle.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A reader comprising:
   a scanning head that comprises an optical sensor to capture an indicia that encodes data and a processor to interpret the indicia to decode the data; and
   an elongate handle connected at a first end to the scanning head and graspable to orient the optical sensor toward the indicia, wherein the elongate handle comprises:
      a first handle receiving coil disposed at a second end of the elongate handle opposite the first end, and oriented parallel to a first side of the elongate handle;
      a second handle receiving coil disposed at the second end, and oriented parallel to a second side of the elongate handle that is opposite the first side of the elongate handle; and
      a battery to provide electric power to the processor and the optical sensor, and configured to be recharged via the first and second handle receiving coils, wherein:
         the second end of the elongate handle is configured to be releasably connected to a presentation base;
         the presentation base is configured to support the reader atop a support surface in a presentation scanning mode that orients the optical sensor to capture the indicia on an object;
         the presentation base comprises:
            a first base transmitting coil configured to be oriented parallel to the first handle receiving coil and to transmit electric power to the first handle receiving coil when the presentation base is releasably connected to the second end of the elongate handle; and
            a second base transmitting coil configured to be oriented parallel to the second handle receiving coil and to transmit electric power to the second handle receiving coil when the presentation base is releasably connected to the second end of the elongate handle; and
         the presentation base comprises a base receiving coil configured to receive electric power wirelessly transmitted to the presentation base by a pad transmitting coil of a charging pad and to convey the wirelessly received electric power to the first and second base transmitting coils to be transmitted to the first and second handle receiving coils, respectively, when the presentation base is supported atop the charging pad as the support surface in the presentation mode.

2. The reader of claim 1, wherein the presentation base comprises a lower base electrical connector that is configured to convey, to the first and second base transmitting coils, the electric power transmitted by the first and second base transmitting coils to the first and second handle receiving coils, respectively.

3. The reader of claim 1, wherein the charging pad comprises a pad electrical connector that is configured to convey, to the pad transmitting coil, the electric power transmitted by the pad transmitting coil to the base receiving coil.

4. The reader of claim 1, wherein the first and second handle receiving coils are carried on opposite sides of the battery.

5. The reader of claim 1, further comprising a data transmitter operable by the processor to wirelessly transmit the decoded data to a point-of-sale device, wherein the battery is configured to provide electric power to the data transmitter.

6. The reader of claim 1, further comprising a radio frequency identification (RFID) sensor to capture wirelessly transmitted data from a RFID tag.

7. A reader comprising:
a scanning head that comprises an optical sensor to capture an indicia that encodes data and a processor to interpret the indicia to decode the data;
an elongate handle connected at a first end to the scanning head and graspable to orient the optical sensor toward the indicia, wherein the elongate handle comprises:
a first handle receiving coil disposed at a second end of the elongate handle opposite the first end, and oriented parallel to a first side of the elongate handle;
a second handle receiving coil disposed at the second end, and oriented parallel to a second side of the elongate handle that is opposite the first side of the elongate handle; and
a battery to provide electric power to the processor and the optical sensor, and configured to be recharged via the first and second handle receiving coils; and
a head receiving coil disposed in the scanning head to wirelessly receive electric power transmitted by a cradle transmitting coil of a charging cradle when the scanning head is received in the charging cradle, wherein:
the battery is further configured to be recharged via the head receiving coil;
the second end of the elongate handle is configured to be releasably connected to a presentation base; and
the presentation base is configured to engage a support surface atop which the charging cradle is also supported to orient the head receiving coil into parallel alignment with the cradle transmitting coil to enable charging of the battery via the cradle transmitting coil.

8. The reader of claim 7, further comprising a data transmitter operable by the processor to wirelessly transmit the decoded data to a point-of-sale device, wherein the battery is configured to provide electric power to the data transmitter.

9. The reader of claim 7, further comprising a radio frequency identification (RFID) sensor to capture wirelessly transmitted data from a RFID tag.

10. A scanning system comprising:
a reader comprising:
a scanning head that comprises a head receiving coil, an optical sensor to capture an indicia that encodes data, and a processor to interpret the indicia to decode the data; and
an elongate handle connected at a first end to the scanning head and graspable to orient the optical sensor toward the indicia, wherein the elongate handle comprises:
a handle electrical connector disposed at a second end of the elongate handle opposite the first end; and
a first battery to provide electric power to the processor and the optical sensor, and configured to be recharged via the head receiving coil or the handle electrical connector;
a charging cradle to receive the scanning head, wherein the charging cradle comprises:
a cradle transmitting coil configured to wirelessly transmit electric power to the head receiving coil when the scanning head is received in the charging cradle; and
a cradle electrical connector to receive the electric power transmitted by the cradle transmitting coil; and
a presentation base configured to be releasably connected to the second end of the elongate handle, wherein, when the base is connected to the second end:
the presentation base is configured to support the reader atop a first support surface in a presentation scanning mode; and
the presentation base is configured to engage a second support surface atop which the charging cradle is also supported to orient the head receiving coil into parallel alignment with the cradle transmitting coil to enable charging of the first battery via the cradle transmitting coil.

11. The scanning system of claim 10, wherein the scanning head further comprises a data transmitter operable by the processor to wirelessly transmit the decoded data to a point-of-sale device, wherein the first battery is configured to provide electric power to the data transmitter.

12. The scanning system of claim 10, wherein the processor is configured to transmit the decoded data to a point-of-sale device through the handle electrical connector.

13. The scanning system of claim 10, wherein the scanning head further comprises a radio frequency identification (RFID) sensor to capture wirelessly transmitted data from a RFID tag.

14. The scanning system of claim 10, wherein the presentation base is configured to support the reader in the presentation scanning mode with the elongate handle oriented to extend within less than 30 degrees of a vertical orientation, and with the optical sensor oriented to capture the indicia on an object also supported atop the first support surface.

15. The scanning system of claim 10, wherein the presentation base comprises:
an upper base electrical connector configured to mate with the handle electrical connector when the presentation base is releasably connected to the second end of the elongate handle; and
a second battery to provide electric power to the reader through the handle electrical connector and the upper base electrical connector when the handle electrical connector and the upper base electrical connector are mated.

16. The scanning system of claim 10, wherein the presentation base comprises:
an upper base electrical connector configured to mate with the handle electrical connector when the presentation base is releasably connected to the second end of the elongate handle; and
a lower base electrical connector that is electrically connected to the upper base electrical connector and is configured to convey electric power received at the lower base electrical connector to the reader through the handle electrical connector and the upper base electrical connector when the handle electrical connector and the upper base electrical connector are mated.

17. The scanning system of claim 10, wherein the presentation base comprises:
an upper base electrical connector configured to mate with the handle electrical connector when the presentation base is releasably connected to the second end of the elongate handle; and
a base receiving coil configured to receive electric power wirelessly transmitted to the presentation base by a pad transmitting coil of a charging pad when the presentation base is supported atop the charging pad as the first support surface in the presentation mode, and configured to convey the wirelessly received electric power to the reader through the handle electrical connector and the upper base electrical connector when the handle electrical connector and the upper base electrical connector are mated.

18. The scanning system of claim 10, wherein:
the elongate handle comprises a first handle receiving coil toward the second end of the elongate handle, and oriented parallel to a first side of the elongate handle;
the first battery is further configured to be recharged via the first handle receiving coil; and
the presentation base comprises a first base transmitting coil configured to be oriented parallel to the first handle receiving coil and to transmit electric power to the first handle receiving coil when the presentation base is releasably connected to the second end of the elongate handle.

19. The scanning system of claim 18, wherein:
the elongate handle comprises a second handle receiving coil toward the second end of the elongate handle, and oriented parallel to a second side of the elongate handle that is opposite the first side of the elongate handle;
the first battery is further configured to be recharged via the second handle receiving coil; and
the presentation base comprises a second base transmitting coil configured to be oriented parallel to the second handle receiving coil and to transmit electric power to the second handle receiving coil when the presentation base is releasably connected to the second end of the elongate handle.

20. The scanning system of claim 18, wherein the presentation base comprises a base receiving coil configured to receive electric power wirelessly transmitted to the presentation base by a pad transmitting coil of a charging pad when the presentation base is supported atop the charging pad as the first support surface in the presentation mode, and configured to convey the wirelessly received electric power to the reader through the first base transmitting coil when the presentation base is releasably connected to the second end of the elongate handle.

21. A scanning system comprising:
a reader comprising:
  a scanning head that comprises an optical sensor to capture an indicia that encodes data and a processor to interpret the indicia to decode the data; and
  an elongate handle connected at a first end to the scanning head and graspable to orient the optical sensor toward the indicia, wherein the elongate handle comprises:
    a first handle receiving coil;
    a second handle receiving coil; and
    a battery to provide electric power to the processor and the optical sensor, and configured to be recharged via the first and second handle receiving coils;
a presentation base configured to be releasably connected to a second end of the elongate handle opposite the first end to support the reader atop a support surface in a presentation scanning mode, wherein the presentation base comprises:
  a first base transmitting coil configured to wirelessly transmit electric power to the first handle receiving coil when the presentation base is releasably connected to the second end of the elongate handle;
  a second base transmitting coil configured to wirelessly transmit electric power to the second handle receiving coil when the presentation base is releasably connected to the second end of the elongate handle; and
  a base receiving coil configured to wirelessly receive the electric power that is wirelessly transmitted by the first and second base transmitting coils; and
a charging pad configured to serve as the support surface, wherein the charging pad comprises:
  a pad transmitting coil configured to wirelessly transmit electric power to the base receiving coil when the presentation base is supported atop the charging pad; and
  a pad electrical connector to receive the electric power wirelessly transmitted by the pad transmitting coil.

22. The scanning system of claim 21, wherein:
the first handle receiving coil is disposed at the second end of the elongate handle, and oriented parallel to a first side of the elongate handle;
the second handle receiving coil is disposed at the second end of the elongate handle, and oriented parallel to a second side of the elongate handle that is opposite the first side of the elongate handle;
the first base transmitting coil is disposed to be oriented parallel to the first handle receiving coil when the presentation base is releasably connected to the second end of the elongate handle; and
the second base transmitting coil is disposed to be oriented parallel to the second handle receiving coil when the presentation base is releasably connected to the second end of the elongate handle.

23. The scanning system of claim 21, wherein:
the base receiving coil is disposed to be oriented parallel to a bottom surface of the presentation base; and
the pad transmitting coil is disposed to be oriented parallel to the base receiving coil when the presentation base is supported atop the charging pad.

* * * * *